July 1, 1958  W. H. ZINN  2,841,545
POWER REACTOR
Filed June 15, 1954   15 Sheets-Sheet 1

INVENTOR.
WALTER H. ZINN
BY
Roland A. Anderson
ATTORNEY

July 1, 1958 W. H. ZINN 2,841,545
POWER REACTOR
Filed June 15, 1954 15 Sheets-Sheet 3

INVENTOR.
WALTER H. ZINN
BY
Roland A. Anderson
ATTORNEY

July 1, 1958

W. H. ZINN 2,841,545

POWER REACTOR

Filed June 15, 1954

INVENTOR.
WALTER H ZINN
BY
ATTORNEY

July 1, 1958 W. H. ZINN 2,841,545
POWER REACTOR
Filed June 15, 1954 15 Sheets-Sheet 5

INVENTOR.
WALTER H. ZINN
BY
ATTORNEY

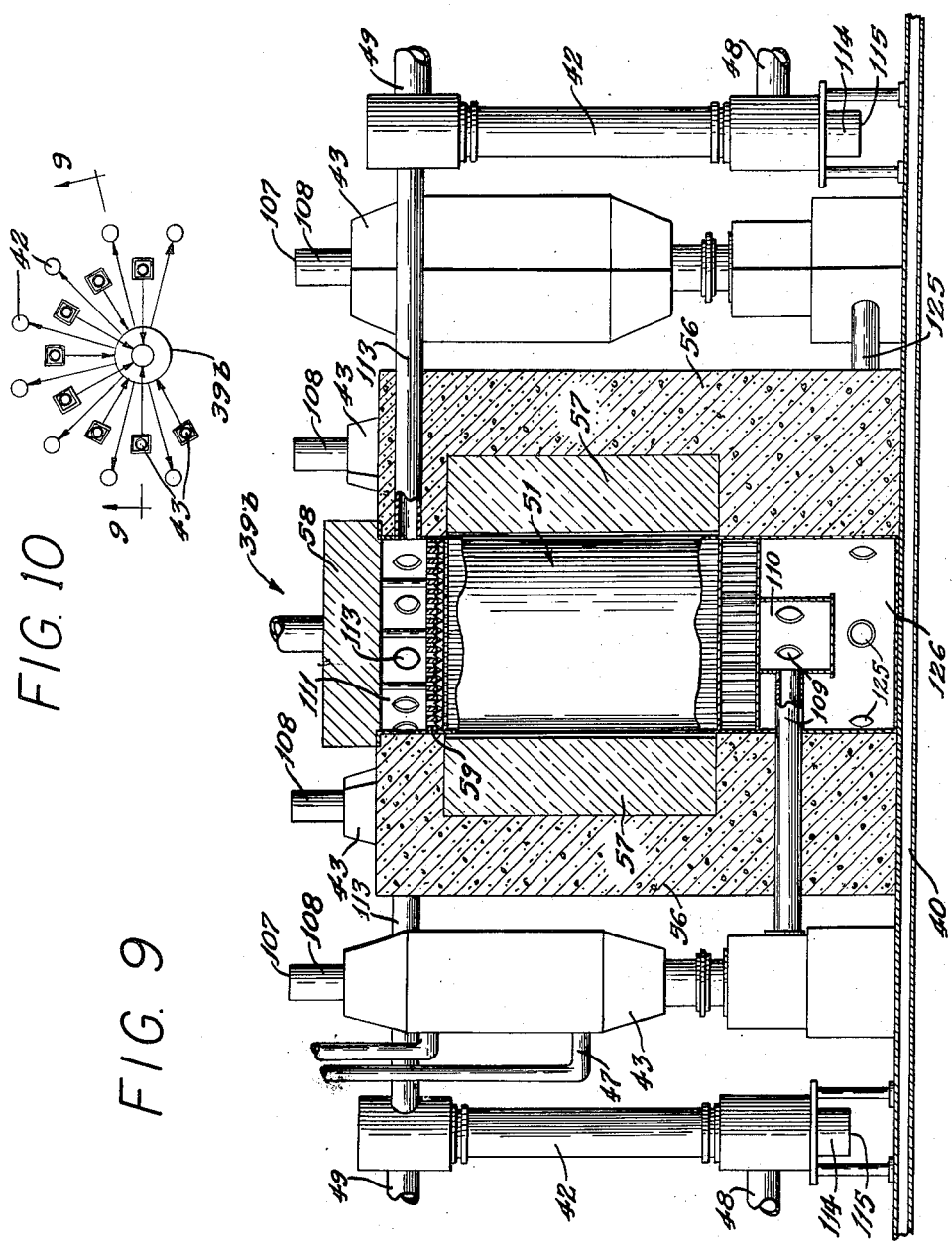

July 1, 1958 W. H. ZINN 2,841,545
POWER REACTOR
Filed June 15, 1954 15 Sheets-Sheet 7
FIG. 11 FIG. 12 FIG. 13
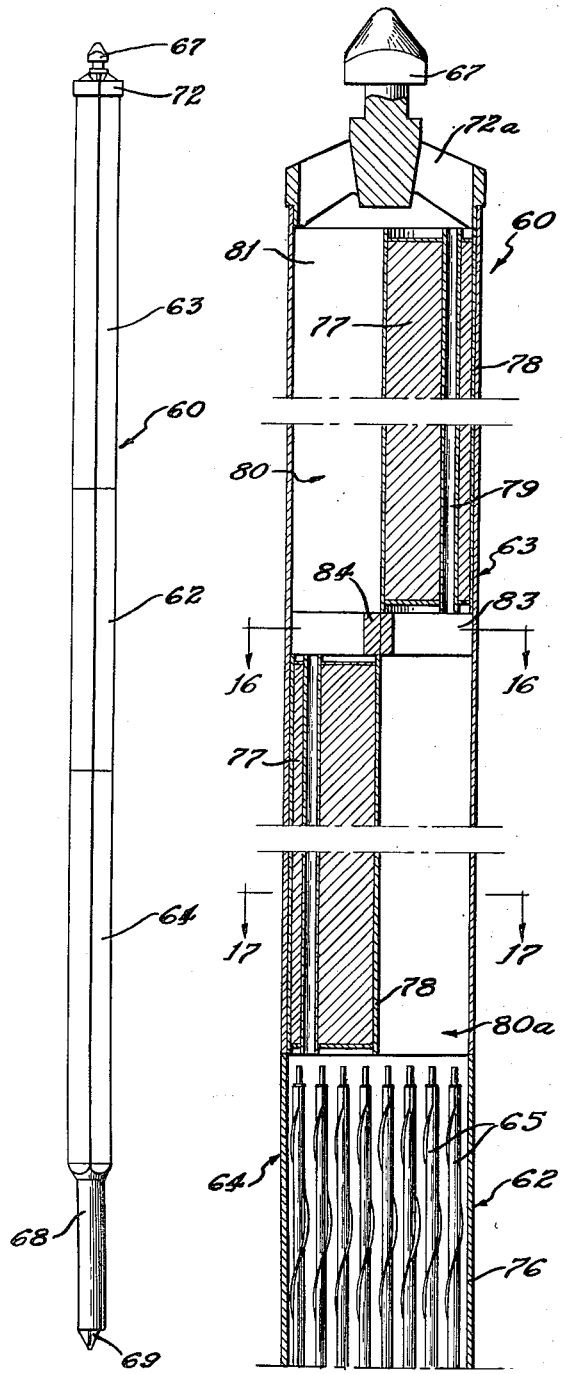
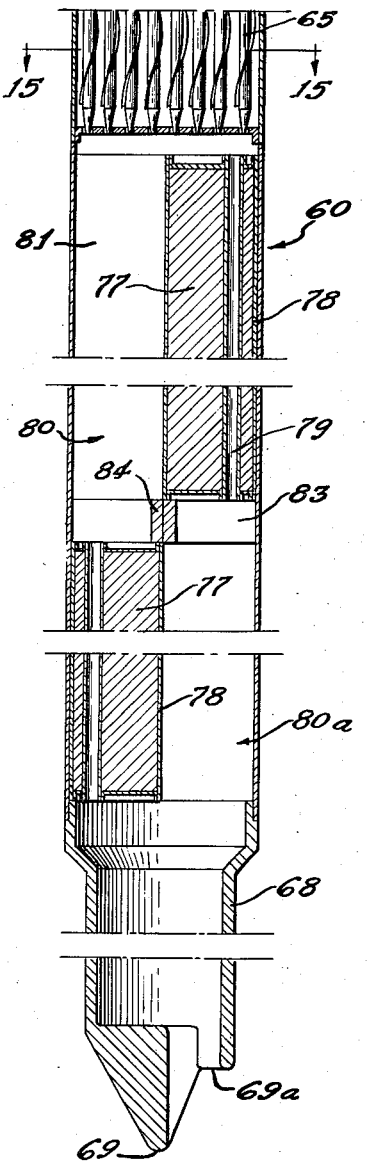
INVENTOR.
WALTER H. ZINN
BY
ATTORNEY July 1, 1958 W. H. ZINN 2,841,545
POWER REACTOR
Filed June 15, 1954 15 Sheets—Sheet 8
FIG. 14
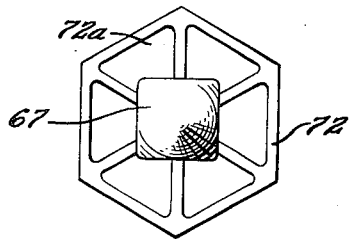
FIG. 18
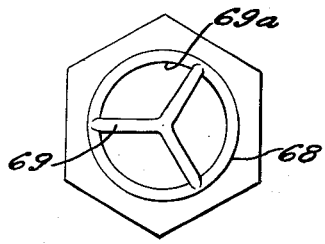
FIG. 19
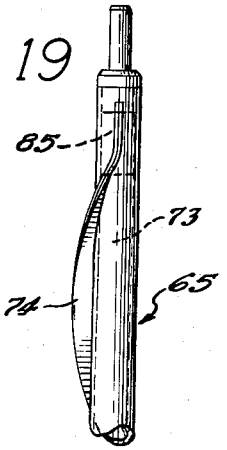
FIG. 15
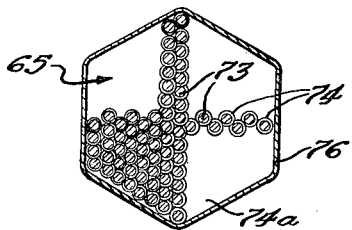
FIG. 20
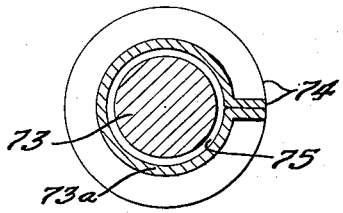
FIG. 16
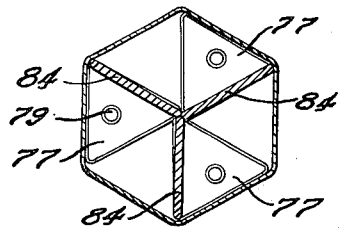
FIG. 17
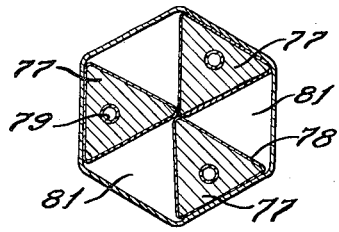
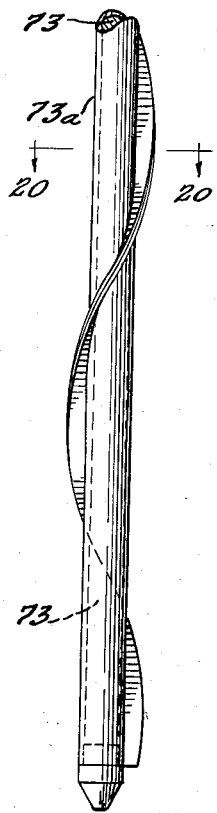
INVENTOR.
WALTER H. ZINN
BY
*Roland A. Anderson*
ATTORNEY July 1, 1958 W. H. ZINN 2,841,545
POWER REACTOR
Filed June 15, 1954 15 Sheets-Sheet 9

INVENTOR.
WALTER H. ZINN
BY
ATTORNEY

July 1, 1958 W. H. ZINN 2,841,545
POWER REACTOR
Filed June 15, 1954 15 Sheets-Sheet 10

INVENTOR.
WALTER H. ZINN
BY
ATTORNEY

INVENTOR.
WALTER H. ZINN
BY
Roland A. Anderson
ATTORNEY

July 1, 1958

W. H. ZINN 2,841,545

POWER REACTOR

Filed June 15, 1954

INVENTOR.
WALTER H. ZINN
BY

ATTORNEY

July 1, 1958     W. H. ZINN     2,841,545
POWER REACTOR

Filed June 15, 1954     15 Sheets-Sheet 13

INVENTOR.
WALTER H. ZINN
BY
ATTORNEY

July 1, 1958

W. H. ZINN 2,841,545

POWER REACTOR

Filed June 15, 1954

INVENTOR.
WALTER H. ZINN
BY
ATTORNEY

July 1, 1958     W. H. ZINN     2,841,545
POWER REACTOR

Filed June 15, 1954     15 Sheets—Sheet 15

INVENTOR.
WALTER H. ZINN
BY
ATTORNEY

United States Patent Office 2,841,545
Patented July 1, 1958

2,841,545
POWER REACTOR

Walter H. Zinn, Hinsdale, Ill., assignor to the United States of America as represented by the United States Atomic Energy Commission Application June 15, 1954, Serial No. 437,017

11 Claims. (Cl. 204—193.2)

The present invention relates generally to nuclear reactors, and specifically to nuclear reactors for the production of power and radioactive isotopes.

In the past nuclear reactors have usually been primarily developed either to produce isotopes or to produce power for military applications, such as submarine and surface ship power plants. The primary requirements of a power producer for military equipment are reliability and compactness and the economic cost of the power produced is not a prime consideration. The mobility and "reliability at all costs" are not necessary characteristics of a nuclear reactor which is to be used for the production of central station power, but the main requirement of such a reactor is the production of power at a total cost of not more than about 6 to 8 mils per kilowatt hour in order that it be economically competitive with coal and oil fired boilers which are conventional at the present time.

It is an object of the present invention to provide such a reactor.

Now, while the utmost reliability of operation, such as is required for military reactors, is not required for central station power reactors, the standards of safety of such a reactor are of the very highest. The power reactors contain a tremendous amount of radioactivity which would be released should the reactor components be vaporized by loss of coolant or other failure of the cooling system. This activity which would be liberated by a vaporization of the reactor elements runs into the millions of curies and it is obvious that, if this amount of activity or any substantial portion of it were liberated by a vaporization of the reactor components, it could cause a tremendous catastrophe in the vicinity of the reactor. Therefore the reactor system designed for central station power requirements must have the utmost protection against a reactor failure which would result in vaporization of the reactive components.

It is the primary object of the present invention to provide a novel nuclear reactor system which minimizes the risk of loss of, or vaporization of, the primary coolant, and thus furnishes the maximum protection against these particular radiation hazards. The novel features of the present system by which this object is accomplished are particularly set forth in the section of the specification entitled "Safety."

Now, while it is an object of the present invention to provide a reactor which will produce power at a cost competitive with conventional fossil fuel central station power plants, it is also recognized that there is at present a very extensive market for such radioactive isotopes as $Pu^{239}$, $U^{233}$, $H^3$, $C^{14}$, $P^{32}$, $S^{35}$, and $I^{131}$. The production of these isotopes by reactors as a by-product of power production offers an attractive method of still further decreasing the cost of power.

It is an additional object of the present invention to provide a reactor which is capable of producing radioactive isotopes and in addition power at a price competitive with current steam boiler plant methods.

Radioactive isotopes may be produced by a neutronic reactor due to the fact that a neutron impinging on an atom of fissionable material, which produces fission, liberates more than two neutrons on the average depending upon the nature of the atom of fissionable material which undergoes the fission. Only one of these neutrons must be utilized to sustain the neutronic chain reaction, while the remaining neutrons may be usced to convert elements into new isotopes. It is desirable to utilize as many of the neutrons which are not necessary to sustain the reaction as possible by absorbing these neutrons in elements which become desirable radioactive isotopes, rather than absorbing these neutrons in materials which transmute to less desirable materials. In fact, in a carefully designed reactor, it is possible that sufficient amounts of $U^{238}$ and $Th^{232}$ may be converted to $Pu^{239}$ and $U^{233}$, respectively, by the absorption of neutrons liberated by the chain reaction, to more than replace the fissionable material consumed as fuel by the reaction. The present reactor is so designed that this conversion takes place at a very small cost to the power production and the value of the materials produced thereby will thus more than pay for the cost of this convertible feature. In fact, conversion products may be considered as a bonus.

Whether the neutronic reactor is to be used for converting nonfissionable isotopes to fissionable isotopes or for the production of nonfissionable radioactive isotopes, the neutron energy spectrum of the reactor is important in determining the conversion or production efficiency of the reactor. The neutron energy spectrum of the reactor may be defined as the neutron energy distribution in the region of the reactor containing the fuel which sustains the neutron chain reaction, generally called the fuel region of the reactor. Neutronic reactors may be classified as fast, intermediate, and slow or thermal, reactors, depending upon the neutron spectrum within the reactor. If the neutron spectrum within the fuel region of the reactor is predominantly of thermal energy, the reactor is termed a thermal or slow reactor, while neutron spectrums averaging up to approximately 1000 electron volts are present in reactors having intermediate energies, and neutron spectrums averaging greater than 1000 electron volts are present in fast reactors.

The energy spectrum of a reactor affects the conversion or production efficiency of a reactor due to several factors. First, nonfission capture by the fuel in the reactor is a function of the energy of the neutron spectrum and is reduced with higher energy neutron spectrums. Second, the loss of neutrons by absorption in structural material of the reactor is also reduced by increasing the energy of the neutron spectrum within the reactor. Third, the loss of neutrons by capture in fission products disposed within the reactor is also reduced by the use of higher energy neutron spectrums. Fourth, the loss of neutrons in coolant materials within the reactor may be reduced by the use of higher energy neutron spectrums. Finally, the neutron losses in so-called "heavy isotopes" within the reactor are reduced with higher energy neutron spectrums. "Heavy isotopes" are isotopes of the fuel resulting from nonfission absorption of neutrons in the fuel which are themselves nonfissionable or essentially nonfissionable with thermal neutrons, an example being $Pu^{240}$ when $Pu^{239}$ is used as the fuel.

The neutron energy spectrum of a reactor is controlled largely by the moderating effect of the materials within the active portion of the reactor. The active portion of the reactor may be defined as the region within which the materials which contribute to the neutronic chain reaction and the materials which it is desired to transmute to other materials are confined. This region contains fuel, structural materials, blanket materials, and coolant. The moderating effects of elements and compositions depend upon the fact that the moderator has a small absorption cross section and a low atomic weight. Hydrogen, deuterium, helium, beryllium, carbon and oxygen have been found to be elements which have these attributes within the proper ranges to be considered as moderators. Therefore, if these elements or compositions consisting predominantly of these elements are not included within the reactor core, the reactor is a fast reactor. The reactor of the present invention is a fast reactor.

The fission cross section of $U^{235}$ for fast neutrons is considerably less than the cross section for thermal neutrons. It is therefore impossible to maintain a nuclear chain reaction with fast neutrons in natural uranium, consisting of approximately 99.3% of $U^{238}$ and 0.7% of $U^{235}$. It is therefore essential that a fast reactor use a fuel having a fissionable isotope present in greater concentration than the 0.7% of natural uranium. This may be accomplished by using enriched uranium, that is, uranium which has been enriched in the $U^{235}$ isotope by treating the uranium in an isotopic separation plant or by adding to natural uranium a quantity of the enriched or pure $U^{235}$ obtained from an isotope separation plant. The present reactor contemplates the use of such a fuel material.

The separation of isotopes, however, is a very expensive process in comparison to chemical separation developments. It is therefore desirable that a fast reactor be able to use a fuel, the fissionable isotope of which is $Pu^{239}$. $Pu^{239}$ is ordinarily produced in converter reactors and separated from the elements with which it is found, namely, uranium and fission products, by chemical separation processes. Now, $U^{233}$, $U^{235}$ and $Pu^{239}$ are the only isotopes currently available in any quantity having any substantial cross section for fission with thermal neutrons. Other isotopes, however, have a substantial cross section for fission with high energy neutrons. Thus, $Pu^{240}$ and particularly $Pu^{241}$ have fission cross sections with fast neutrons which compare favorably with the fast neutron fission cross section of $Pu^{239}$ and $U^{235}$. Now, both natural uranium which has been depleted in its $U^{235}$ content by high burnup in a thermal reactor and plutonium which has been substantially enriched in its $Pu^{240}$ and $Pu^{241}$ component by high burnup in a reactor are waste products as far as any potential use in a thermal reactor for the uranium, or use in an atomic weapon for the plutonium, are concerned. A mixture of these two components, however, can make a highly desirable fuel for a fast reactor, provided the fast reactor is so designed that it can use this fuel. It is therefore an object of the present invention to provide a reactor which can use natural uranium enriched in $U^{235}$, or a fuel in which the fissionable material is plutonium. It is also contemplated that the present reactor can be used with a fuel in which the fissionable material is $U^{233}$, $Pu^{241}$, or other similar isotopes.

Another object of the invention is to provide a reactor which may be used as an isotope converter and which may be used to produce power simultaneously. As explained above, the cost of power produced for commercial purposes may be reduced if the reactor may at the same time be used for converting elements or isotopes into other useful radioactive isotopes. This is particularly true if the isotope formed is thermally fissionable, such as $U^{233}$ and $Pu^{239}$, since the fuel consumed by the reactor would then be at least partially replaced by the fuel produced by the fission reaction itself.

Further objects and advantages of the present invention will be more fully understood from the following detailed description read with reference to the drawings wherein:

Figure 9 is a vertical sectional view of an upward parallel-flow reactor and associated primary heat exchangers and primary pumps, taken along line 9—9 of Figure 10.

Figure 10 is a schematic plan view of the upward parallel-flow reactor and associated primary heat exchangers and primary pumps.

Figure 11 is an elevational view of a reactor fuel rod.

Figure 12 is a sectional vertical elevation of an upper portion of a fuel rod showing fuel elements and upper blanket prisms.

Figure 13 is a sectional vertical elevation of a lower portion of a fuel rod showing fuel elements, lower blanket prisms, base and tip.

Figure 14 is a plan view of a reactor fuel rod.

Figure 15 is a transverse sectional view of a fuel rod assembly showing only some of the fuel rods used and is taken along line 15—15 of Figure 13.

Figure 16 is a transverse sectional view of the upper blanket portion of the fuel rod, taken across line 16—16 of Figure 12.

Figure 17 is a transverse sectional view of the upper blanket portion of a fuel rod, taken across line 17—17 of Figure 12.

Figure 18 is a bottom plan view of a reactor fuel rod.

Figure 19 is a vertical elevation of a reactor fuel element.

Figure 20 is a transverse sectional view of a fuel element taken across line 20—20 of Figure 19.

The term nuclear reactor in the present specification is used to denote the shield, reflector, and active portion of a chain reacting device. The term nuclear reactor system is used to designate the nuclear reactor, primary coolant system, including reactor tank, primary coolant heat exchanger, primary coolant pump, and primary coolant.

It will be noted in the description that follows that the primary object of the present invention is achieved through the following novel structure. The reactor, primary coolant, and primary coolant system are all contained within an imperforate reactor tank, thus precluding the loss of the primary coolant through ordinary mishap or accident. The reactor system is so constructed that a positive convective flow of the mass of the primary coolant is maintained from the reactor tank through the reactor coolant passages by the heat generated in the reactor after shutdown of the fission process in the reactor, and without the application of other pumping action to the primary coolant system. The structural features which make this possible include the open circuit primary coolant system with inlet and outlet to the primary coolant mass in the reactor tank, the vertical reactor coolant passages, and the low resistance to free flow of liquids of the primary coolant circuit. These features are described in particular detail in the section of the specification entitled "Safety."

REACTOR

Several modifications of the present reactor are illustrated in the figures. Three sizes are illustrated, the 50 liter size, the 500 liter size and the 800 liter size. The size figure refers to the volume of the fuel region of the reactors. The 50 liter size has a fuel region power density of 1 megawatt per liter and a total power capacity of 62.5 megawatts of heat. The 500 liter size has a fuel region power density of 1.5 megawatts per liter and a power capacity of 883 megawatts of heat energy. The 800 liter size has a fuel region power density of 1.0 megawatt per liter and a total capacity of 940 megawatts of heat energy. The 50 liter size is suitable for smaller power plant requirements, particularly such requirements as advanced military base power plant requirements. The 500 and 800 liter sizes are suitable for large central station power plant requirements.

Figure 1:
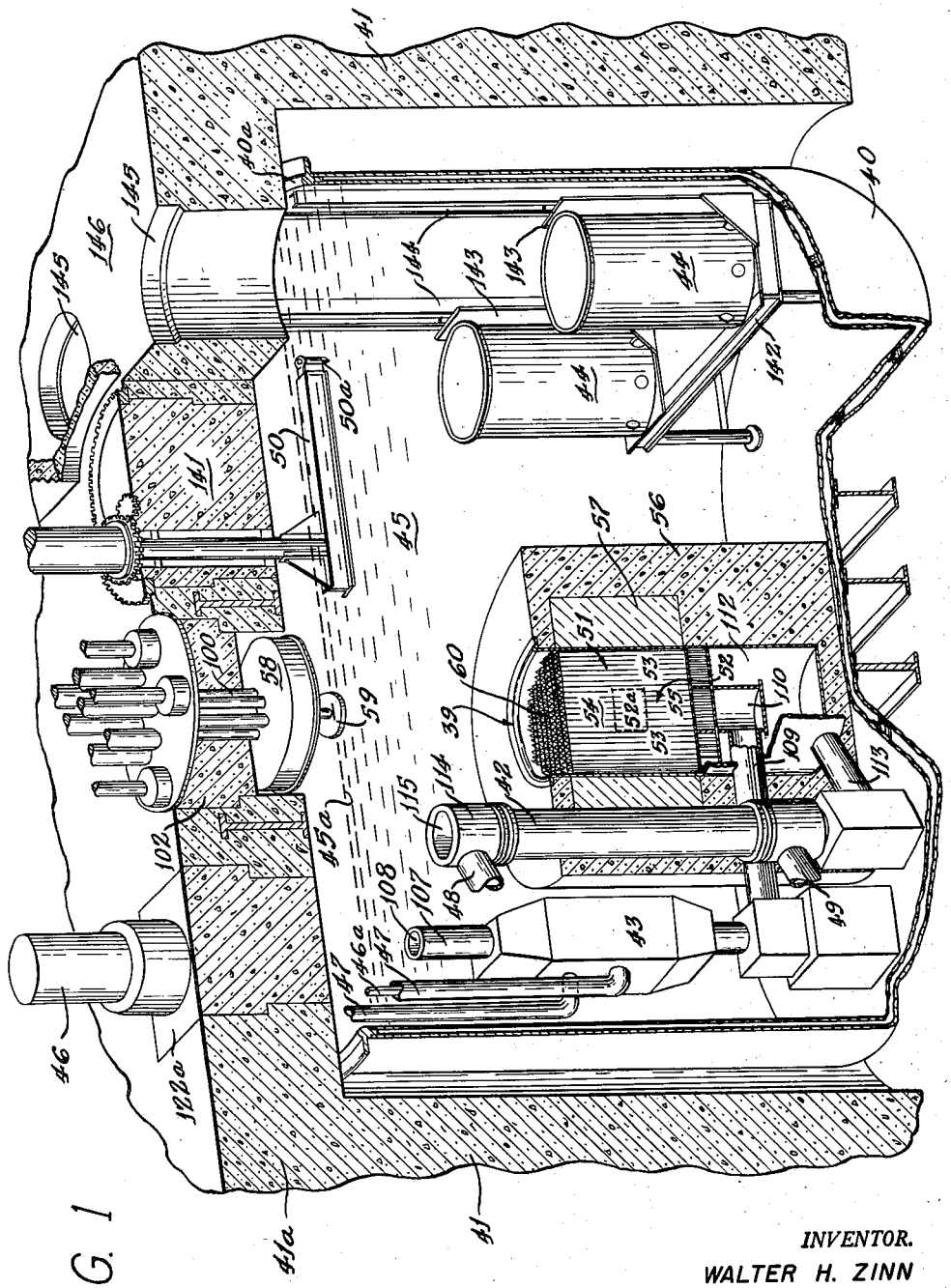
Figure 1 is an isometric sectional view of a series-flow reactor, a heat exchanger, a coolant pump, and a tank in which they are submerged.
Figure 2:
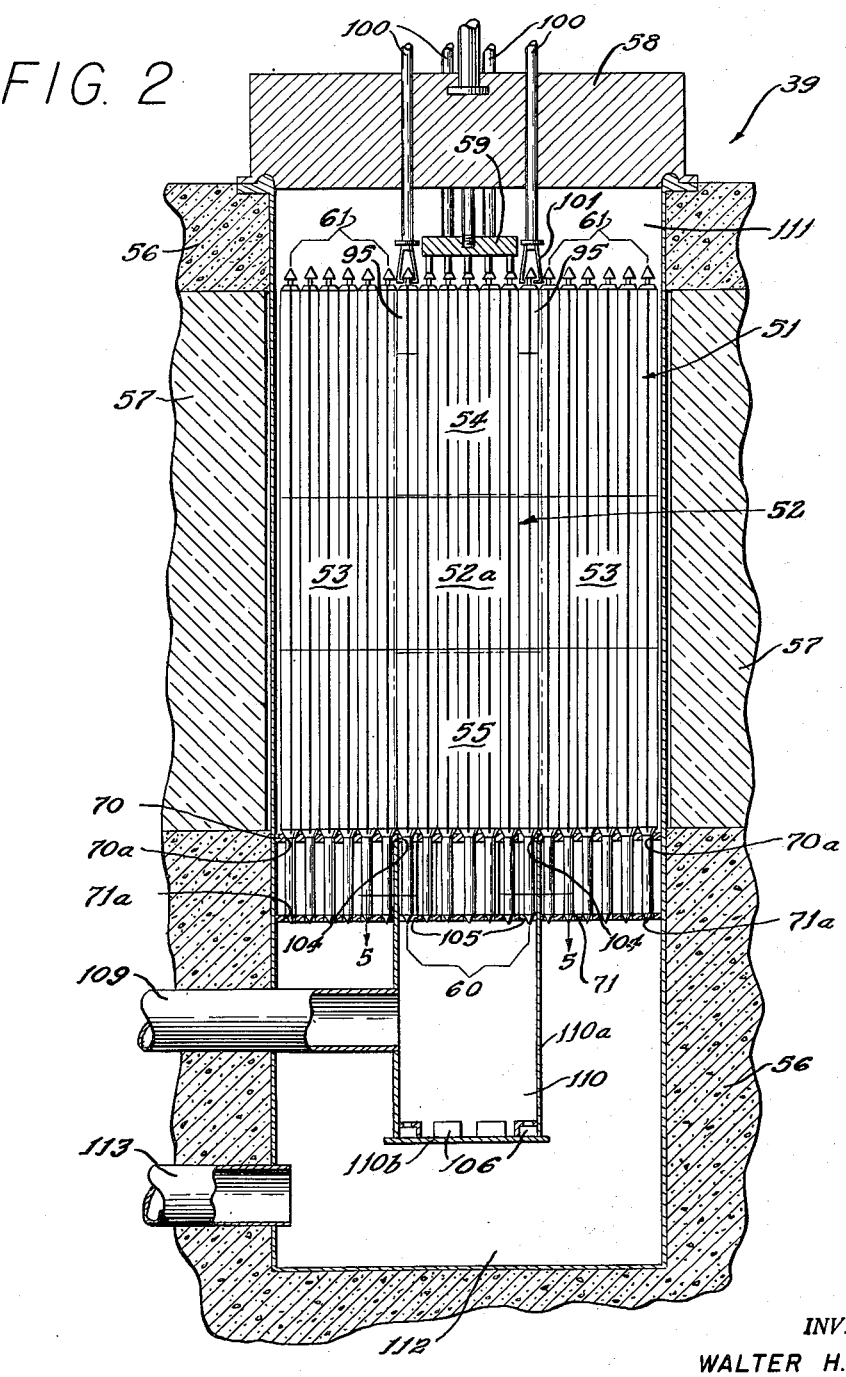
Figure 2 is an enlarged vertical sectional view of the core of the series-flow reactor of Figure 1.
Figure 3:
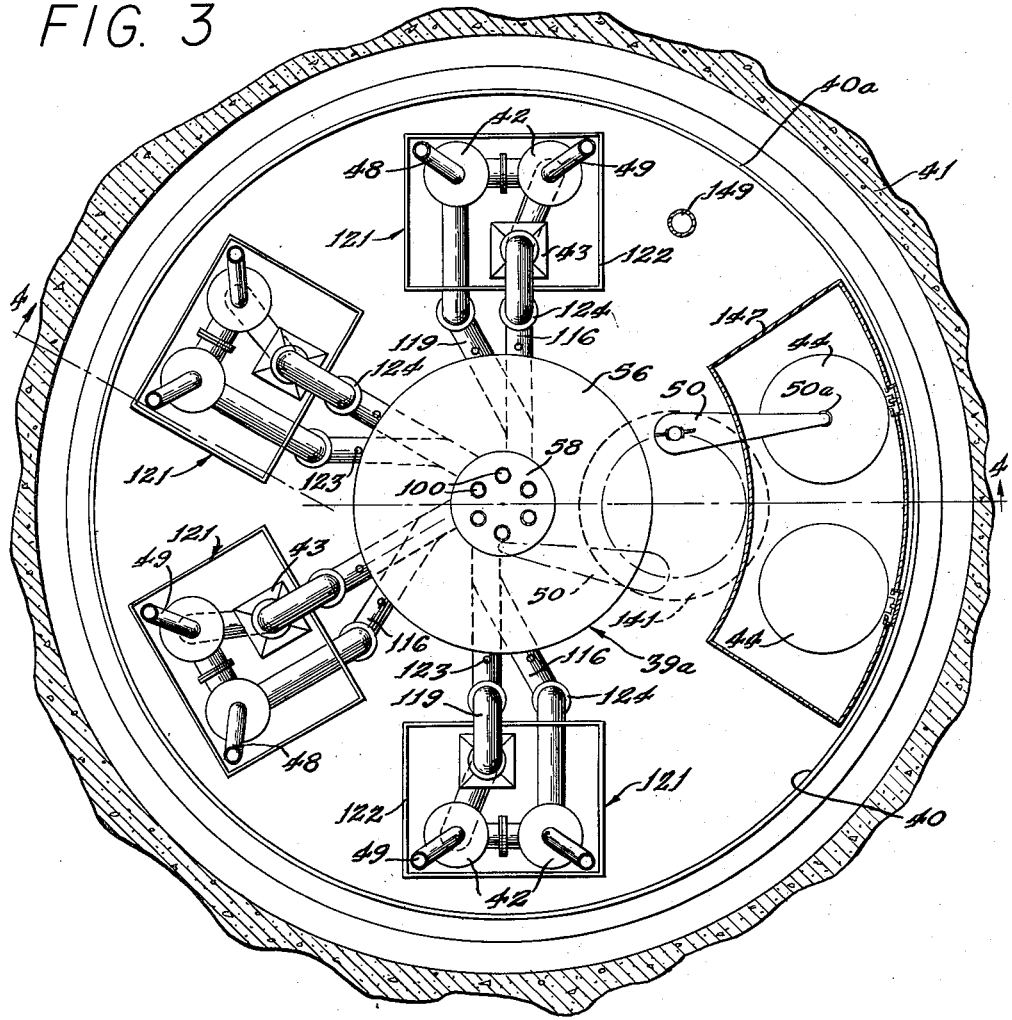
Figure 3 is a plan view of a downward parallel-flow reactor, heat exchangers, coolant pumps, and a tank in which they are submerged.
Figure 5:
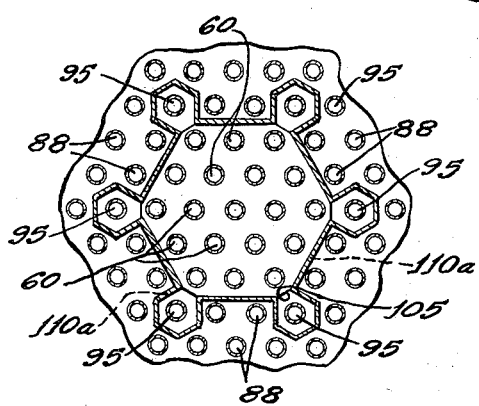
Figure 5 is a fragmentary horizontal sectional view of the reactor core and inlet manifold of the series-flow reactor taken along line 5—5 of Figure 2.

Several modifications of coolant flow are illustrated. In Figures 1 and 2 the primary coolant flows in series upward through the reactor core and then downward through the reactor blanket. In Figure 3 the primary coolant flows downward through the reactor core and blanket and this modification is usually termed a parallel-flow reactor. In Figure 9 the primary coolant has a parallel flow upward through the reactor core and reactor blanket.

The reactor 39 is contained in a tank 40. The tank is an imperforate unitary tank, that is, it has no openings or outlets below the rim 40a of the tank. For the 50 liter reactor the tank is an oval tank 36 feet by 26 feet and 22 feet deep. The dimensions of the tank for the 500 and 800 liter reactors are 40 feet by 28 feet by 22 feet. The reactor tank is contained in a thick-walled concrete reactor cell 41 which also has no openings below the roof 41a of the cell. The tank 40 contains not only the reactor itself but also the primary heat exchanger 42, the primary coolant pump 43, and the fuel rod storage tanks 44. The reactor tank 40 is substantially filled with the primary coolant, preferably sodium, 45, which completely immerses the reactor, primary heat exchanger 42 and primary coolant pump 43. The electrical power for operating the primary coolant pump 43 is supplied to the pump from an electric generator 46 through bus bars 46a contained in conduits 47. The secondary coolant enters the primary heat exchanger by the secondary coolant inlet line 48 and leaves by the secondary coolant exit line 49. A jib crane 50 is provided for the remote control handling of fuel rods between the reactor and the fuel rod storage tanks 44. The reactor has an active portion 51 including a core section 52, and a radial blanket section 53. The core consists of a fuel region 52a, an upper blanket section 54 and a lower blanket section 55. The active portion 51 of the reactor is disposed within a shield 56 which also contains a reflector portion 57. A lid 58 is provided for the active portion 51. In the reactor modifications having an upward flow of coolant through the core, an upper core grid 59 is also provided to prevent the fuel rods 60 from being displaced upwardly by the flow of the coolant.

THE REACTOR ACTIVE PORTION

The active portion 51 of the reactor is best illustrated by Figures 1, 2 and 6 to 8 and contains a plurality of fuel rods 60 and blanket rods 61 disposed within the active portion 51. The fuel rods 60 need not be of any particular construction as long as they are of suitable physical structure, permit adequate cooling, and contain the proper materials in proper proportions, as will be later set forth. The fuel rods 60 disclosed in Figures 11 through 20 are suitable for the present reactor. Other suitable fuel rods are shown and claimed in copending applications of the common assignee, Serial No. 321,076, "Fuel Element," filed November 18, 1952, and Serial No. 236,644, "Fuel Element," filed July 13, 1951.

The fuel rod 60 is comprised essentially of three regions, a fuel section 62, an upper blanket or absorber section 63 and a lower blanket section 64. In the fuel rod illustrated in the present application the fuel section is comprised of a plurality of fuel elements 65, each element containing a quantity of an isotope fissionable with thermal neutrons, such as $U^{235}$, $Pu^{239}$ or $U^{233}$, in a suitable form, such as a metal or a salt, and disposed in a suitable diluent, such as $U^{238}$, titanium or zirconium. The upper blanket section 63 and the lower blanket section 64 of the fuel rods are comprised of triangularly-shaped prisms 77 of absorbing material. This material may be either a material capable of being converted into a nuclear fuel by neutron absorption, such as $U^{238}$ or $Th^{232}$, or it may be some other material which will produce a useful material through neutron irradiation, such as $Co^{59}$ which produces the radiation source material $Co^{60}$. Referring to Figure 11, the fuel rod is provided with a hanger 67 at one end and at the other end a base 68 with tip 69. The tip contains an orifice 69a. The base is designed to fit in an aperture 70a in the base plate 70 and the tip in an aperture 71a in the tip plate 71, so that the fuel rod is held upright in the active portion of the reactor. The hanger 67 is attached to the hanger plate 72 which also has an orifice 72a in it which permits the flow of primary coolant from the fuel rod. The hanger 67 is adapted to be gripped by the hook 50a of the jib crane 50. The area of the orifices 69a and 72a may be varied to adjust the flow of coolant through the rod 60.

The fuel section 62 is comprised of a plurality of fuel elements 65. As illustrated in Figures 20 and 19, the fuel element consists of one or more fuel cylinders 73 contained in a thin-walled tube 73a. In the modification illustrated, the fuel cylinder is an alloy of uranium and plutonium with the plutonium present as about 5 to 15% of the total mass, and preferably about 10, and the uranium balance being natural uranium, i. e. having an isotope content of 99.3% $U^{238}$ and 0.7% $U^{235}$, or preferably a uranium which has been depleted in $U^{235}$, i. e. uranium having a $U^{235}$ content of less than 0.7%. The uranium which has been depleted in $U^{235}$ is a relatively inexpensive by-product of a $U^{235}$ enrichment process or a plant recovering plutonium from neutron-irradiated uranium. While the plutonium content of the uranium-plutonium alloy should predominate in the thermally fissionable isotope $Pu^{239}$, the plutonium may be contaminated with very substantial amounts of higher plutonium isotopes such as $Pu^{240}$ and $Pu^{241}$, since both of these isotopes are fissionable with neutrons in the intermediate and fast energy spectrums. The plutonium may be replaced in the fuel alloy with other thermally fissionable materials, such as $U^{233}$ and $U^{235}$. Since the present reactor is designed to operate in the fast neutron range, other actinide isotopes having fission cross sections in this range, such as $Np^{237}$, may also be used as the fissionable component. A fissionable isotope will be suitable for use in a particular reactor if the fuel region of the reactor satisfies the equation $$\Sigma_f \eta > \Sigma_c$$

for the energy range in which the reactor will operate.

$\Sigma_f$ is the macroscopic fission cross section of the fissionable component, or components, averaged over the particular energy range.

$\Sigma_c$ is the macroscopic capture cross section of all components of the fuel region of the reactor.

$\eta$ is a factor obtained by the solution of the equation $$\eta = \frac{\nu_1 \Sigma_{1f} + \nu_2 \Sigma_{2f} \ldots}{\Sigma_{1a} + \Sigma_{2a} + \Sigma_{3a} \ldots}$$

$\Sigma_{1f}$ is the macroscopic fission cross section of the major fissionable component of the fuel alloy;

$\Sigma_{2f}$ is the macroscopic fission cross section of the diluent, if it contributes to the chain reaction;

$\Sigma_{1a}$ is the macroscopic absorption cross section of the fuel alloy;

$\Sigma_{2a}$ is the macroscopic absorption cross section of the structural material in the fuel region; and $\Sigma_{3a}$ is the macroscopic absorption cross section of the coolant in the fuel region. (If more than one component contributes to the cross section, the cross section is the average of the individual cross sections. In all cases the cross section is averaged over the energy range in which the reactor operates.)

$\nu$ is the number of fast neutrons released per fission.

The average energy range of the neutrons upon which the present reactor operates lies between about 0.2 m. e. v. and 0.8 m. e. v.

The fuel tube 73a is preferably constructed of a stainless steel. The fuel tube of the present embodiment is a 0.188-inch outside diameter stainless steel tube having a rib 74 of the same material as the tube, which spirals around the outside of the tube on a 4-inch pitch. These ribs serve to hold the tubes 0.066 inch apart when the tubes are massed together. In the 800 liter reactor 169 tubes are massed into a hexagonal pattern or assembly 74a. The primary coolant flows between and around the elements in the assembly. There is an internal bond 75 in the tube between the fuel cylinder and the tube, consisting of sodium. The assembly of 169 tubes is held together in a hexagonal stainless steel sheath 76 and is shown in Figure 15.

The upper blanket section 63 of the fuel rod 60 is comprised of a plurality of triangular prisms of a fertile material, preferably a uranium depleted in $U^{235}$ below the concentration occurring in natural uranium. The upper blanket prisms are covered with a cladding 78 of a material such as is used for the fuel tubes 73a, such as stainless steel. The prisms 77 contain a channel 79 which provides an internal path for the flow of primary coolant. The six prisms normally employed in the upper blanket section are arranged in two banks of three prisms each. The upper bank 80 has three prisms equidistantly spaced from each other and separated from each other by triangular-shaped coolant channels 81. The lower prism bank 80a of the upper blanket section 63 has its prisms 77 arranged in a similar manner. There is an offset coolant channel 83 between the upper and the lower banks of the upper blanket section, as shown in Figures 12, 16 and 17. Since the prisms of the upper and the lower banks are offset, no straight line path is presented to neutrons generated in the fuel region 62 of the fuel element 60, and thus the tendency of "neutron streaming" is suppressed. The offset channel section 83 of the upper blanket region has three dividers 84 equidistantly spaced in the offset section, as shown in Figures 12 and 16, in such a manner as to limit the tendency for the primary coolant to assume turbulent flow through this offset.

The components of the lower blanket region 64 of the fuel rod, namely, the prisms 77, the prism cladding 78, the prism coolant channels 79 and the offset channel dividers 84 are substantially identical with those of the upper blanket region of the fuel element. The configurations of the upper bank 80 and the lower bank 80a and the offset channels 83 are also similar to those of the upper blanket region. The upper blanket section, the fuel region and the lower blanket region of the fuel element are joined together as shown in Figure 11.

Figure 6:
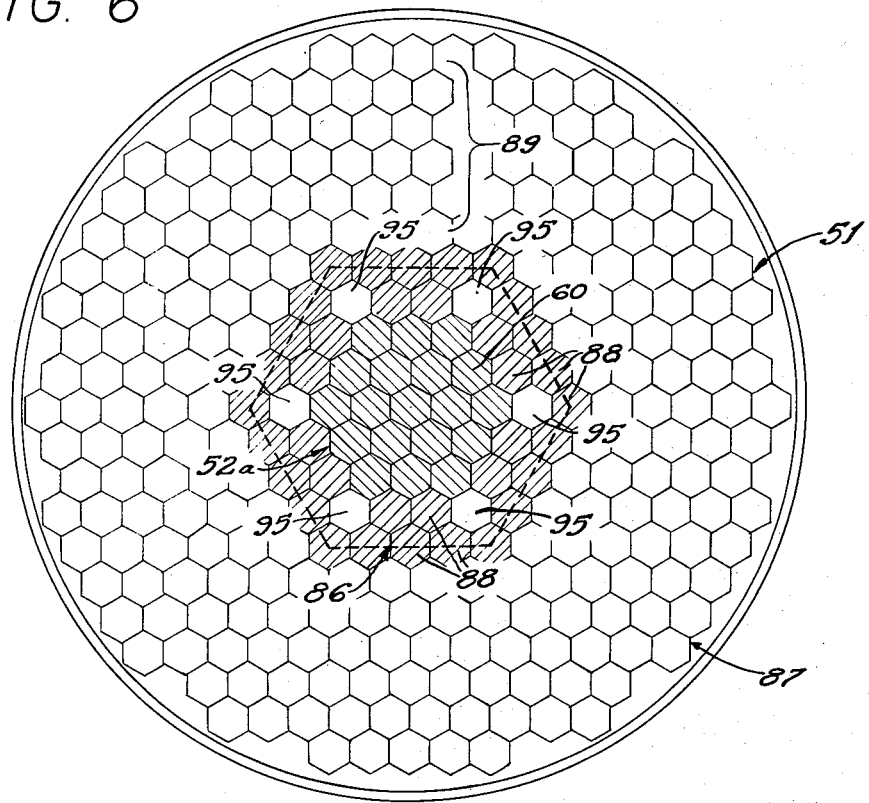
Figure 6 is a schematic plan view of the active portion of the series flow reactor showing the arrangement of fuel, blanket and control rods.
Figure 7:
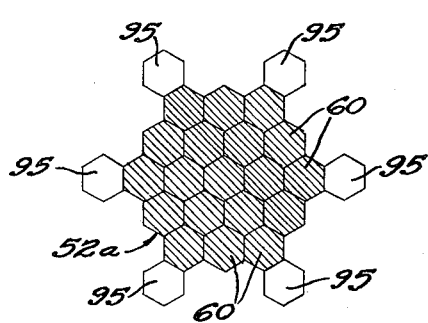
Figure 7 is a schematic plan view of the core of the series-flow reactor.

The dimensions of a typical fuel element as employed in the 800 liter reactor modification are 109 inches overall length, and 3.65 inches across the flats of the hexagon assembly; the fuel rod is 38⅜ inches long, the fuel cylinder 73 is 36 inches long with a 2½-inch long expansion chamber 85 above the fuel cylinder. The blanket prisms 77 of the upper and lower blanket sections 63 and 64 are each 12 inches long and the offset channels 83 are 1 inch long. The fuel rods 60 are massed together, as shown in Figures 6 and 7, in the core 52 of the reactor to form a hexagonally-shaped cluster of fuel rods. Since each of the fuel rods 60 contains a fuel section in the middle of the fuel element, the hexagonal cluster of fuel rods will define a hexagonal prism containing the fissionable material in the center of the reactor which is termed the fuel region 52a. The fuel region dimensions, fuel region composition in volume percent, and the number of fuel rods involved in the various reactors are shown in Table I. It will be noted that the fuel region contains between about 3 and 10 volume percent of thermally fissionable material, and between about 20 and 32 volume percent of a diluent. The diluent can be chosen because it forms a desirable product upon neutron irradiation, because it

*Table I*

|  | Reactor | | |
|---|---|---|---|
|  | 50 liters | 500 liters | 800 liters |
| Fuel Region Dimensions: |  |  |  |
| Length, inches | 14.3 | 30.2 | 36 |
| Diameter, inches | 16.5 | 35.9 | 41.5 |
| Length/diameter ratio | 0.87 | 0.84 | 0.87 |
| Volume, liters | 50 | 500 | 800 |
| Volume, cu. ft. | 1.77 | 17.67 | 28.25 |
| Area, sq. ft. | 1.48 | 7.02 | 9.43 |
| Heat Production Active Portion, Mw. | 50 | 750 | 800 |
| Fuel Region Composition (vol. percent): |  |  |  |
| Fuel alloy | 33.5 | 30 | 33.5 |
| Thermally fissionable material | 9.74 | 3.26 | 3.4 |
| Structural material | 14.8 | 14 | 14.8 |
| Flowing coolant | 45 | 50 | 45 |
| Stagnant coolant (internal bond) | 6.7 | 6 | 6.7 |
| Fuel Element Rod: |  |  |  |
| Fuel cylinder diameter, inches | 0.164 | 0.164 | 0.164 |
| Tube thickness | 0.008 | 0.008 | 0.008 |
| Fuel element O. D., inches | 0.188 | 0.188 | 0.188 |
| No of elements per rod | 169 | 169 | 169 |
| No. of rods per reactor | 19 | 85 | 127 |
| Wt. plutonium per fuel element, grams | 28 | 21 | 21 |
| Fuel Composition: |  |  |  |
| Fuel alloy, kg. | 310 | 2,760 | 4,940 |
| Plutonium (critical mass), kg. | 90 | 300 | 450 |
| Enrichment, percent | 29.0 | 10.8 | 9.1 |
| Blanket: Uranium in blanket, kg. | 45,500 | 91,000 | 109,000 | has a relatively high fast fission cross section, or because it forms a metallurgically satisfactory alloy with the thermally fissionable component of the alloy. Lithium is an example of the first, $Np^{237}$ of the second, and zirconium of the third. The preferred diluent, uranium, is advantageous from all three viewpoints. In the large reactors the active portion contains between about 300 and 450 kg. of plutonium, contained in a fuel alloy occupying between about 30 and 35 volume percent of the active portion.

In the above table, the term "flowing coolant" refers to the quantity of primary coolant flowing through the core section at any instant of full power operation. The term "stagnant coolant" refers to the coolant contained in the fuel rods as a liquid bond between the fuel cylinder and the fuel tube. The fuel alloy described above is plutonium, contained in a matrix of depleted uranium. It will be noted that the volume percent of plutonium required for critical reactivity is much greater in the 50 liter reactor.

While the fuel alloy described above is plutonium contained in a matrix of depleted uranium, other fuel materials may be used. For example, $U^{235}$ may be substituted for the plutonium in the fuel material of the above reactors. A considerably larger quantity of $U^{235}$ will, however, be required for the critical mass in reactors of the above-described configurations. The comparative quantities of the fissionable material required for critical mass in the reactors are shown in the following table.

Table II

| Reactor | Critical Mass | |
|---|---|---|
| | $Pu^{239}$ | $U^{235}$ |
| | Kg. | Kg. |
| 50 liter | 90 | 150 |
| 500 liter | 300 | 500 |
| 800 liter | 450 | 750 |

Other fissionable materials such as $U^{233}$, $Pu^{241}$ and $Am^{242}$ may also be substituted as the fuel. It is also contemplated that mixtures of fissionable materials, such as $U^{235}$ and $Pu^{239}$, may be used as the fissionable component of the fuel material of the present reactor. The critical masses of other fissionable materials may be determined for particular reactor active portion configurations according to the methods disclosed in such publications as "Current Status of Nuclear Reactor Theory," A. Weinberg, Am. J. of Phys., vol. 20, October 1952, pp. 401–412, and "Multigroup Methods for Neutron Diffusion Problems," R. Ehrlich and H. Hurwitz, Jr., Nucleonics, vol. 12, No. 2, February 1954, pp. 23–30. The pertinent cross-sectional data may be obtained from such publications as "Neutron Cross Sections," AECU–2040, OTS, Dept. of Commerce.

REACTOR BLANKET

Figure 8:
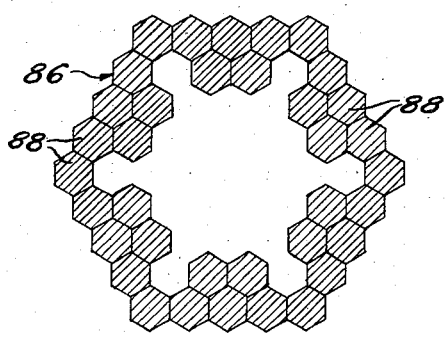
Figure 8 is a schematic plan view of an inner blanket surrounding the core of the series-flow reactor.
Figure 21:
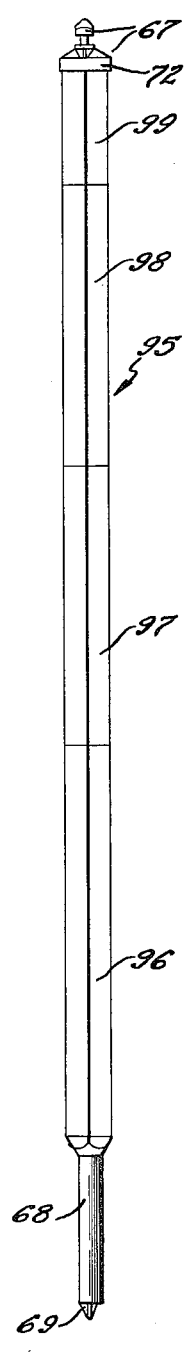
Figure 21 is a vertical elevation of a reactor control rod.
Figure 22:
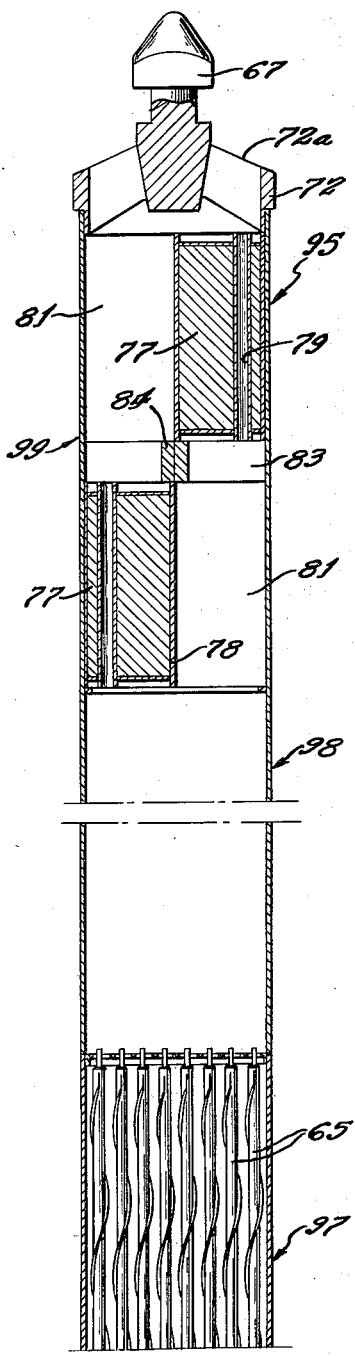
Figure 22 is a vertical sectional view of the upper portion of a control rod showing fuel elements and upper blanket prisms.
Figure 23:
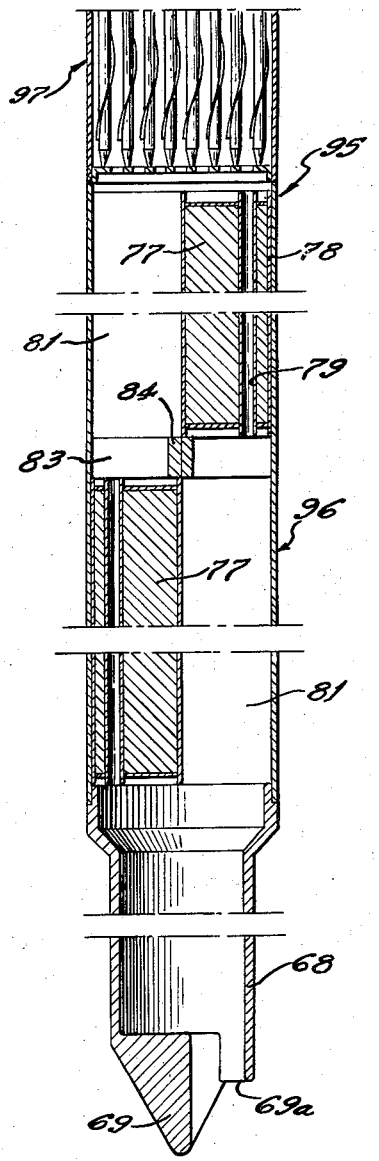
Figure 23 is a vertical sectional view of the lower portion of the control rod showing fuel elements and lower blanket prisms.
Figure 24:
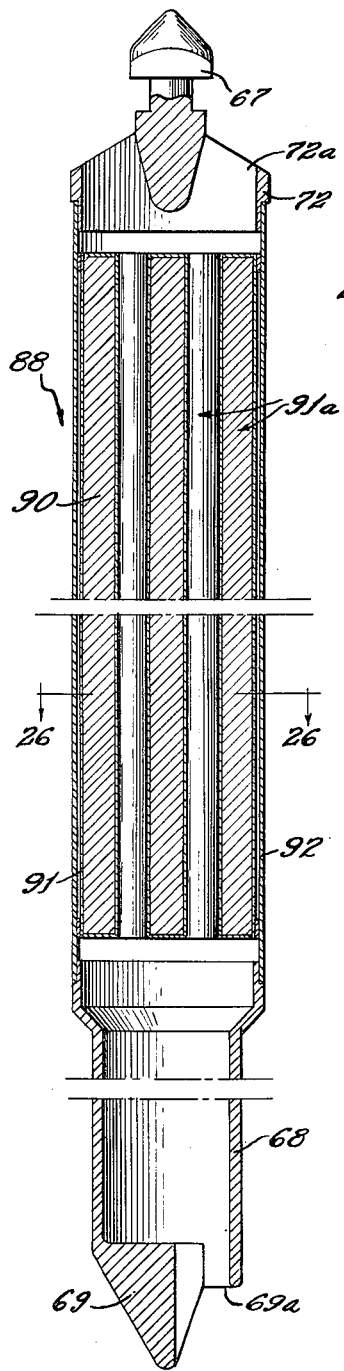
Figure 24 is a vertical sectional view of the inner blanket rod.
Figure 25:
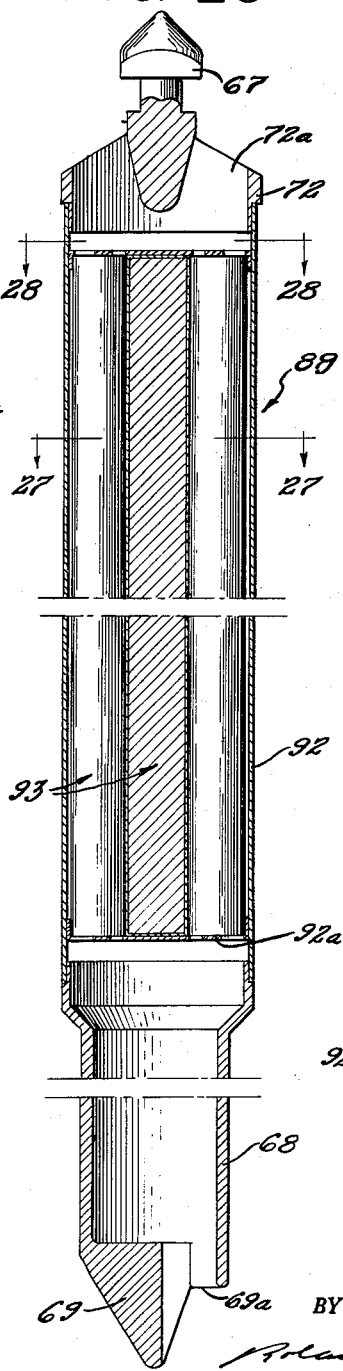
Figure 25 is a vertical sectional view of the outer blanket rod.
Figure 26:
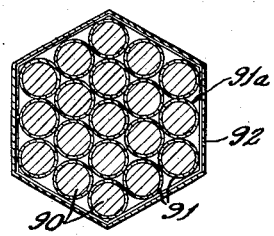
Figure 26 is a transverse sectional view of an inner blanket rod, taken across line 26—26 of Figure 24.
Figure 27:
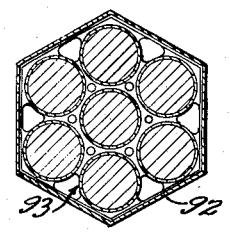
Figure 27 is a transverse sectional view of an outer blanket rod, taken across line 27—27 of Figure 25.
Figure 28:
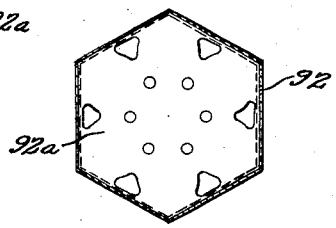
Figure 28 is a transverse sectional view taken on the line 28—28 of Figure 25 and showing a blanket-rod plate.

The radial blanket of the reactor is divided into two regions, an inner blanket region 86, as shown in Figure 8, and an outer blanket region 87, as shown in Figure 6. These regions are made up of several layers of inner blanket rods 88 and outer blanket rods 89. The external appearances of the inner blanket rod and the outer blanket rod are identical with each other and with the fuel rod 60, including identical hangers 67, hanger plates 72, bases 68 and tips 69. The inner and outer blanket rods contain cylinders of absorbing material. In the reactors illustrated, this absorbing material (also referred to as fertile material) is uranium which has been depleted in the uranium isotope $U^{235}$ below the content of $U^{235}$ normally found in natural uranium. This depleted uranium is a by-product of isotopic separations of uranium or of the use of uranium as a fuel in nuclear reactors. Other materials, however, may be employed in this rod. For example, natural thorium may be employed if it is desired to produce $U^{233}$; lithium or lithium alloys may be employed if it is desired to produce tritium; or such elements as the natural cobalt isotope $Co^{59}$ may be employed if it is desired to produce the isotope $Co^{60}$.

The absorbing material in the inner blanket rod 88 is in the form of a cylinder 90 which is covered with a cladding 91 of a suitable material, such as zirconium, stainless steel, a nickel alloy, a titanium alloy or an aluminum alloy, to form a blanket element 91a. These cylinders are packed tightly into the rod sheath 92. The inner blanket elements 90 are supported in the casing by spot welding of the blanket elements together, or other conventional methods. The interstices between these rods and between rods and sheath wall permit a flow of primary coolant up through the rods and around each cylinder. The outer blanket rods 89 contain cylinders 93 of absorbing material clad with the same materials as the cylinders of the inner blanket rods and substantially identical in configuration, with the exception that the outer cylinder rods are considerably larger and accordingly less of them are packed into the blanket rod sheath 92 than are the cylinders of the inner blanket rod. Because of the proximity of the blanket rods to the reactor core and the consequent higher neutron flux, a great deal more heat is generated in the inner blanket region than in the outer blanket region. The heat generated results in large part from the fissioning of uranium atoms in this region. The cylinders 90 are therefore made smaller than are the outer blanket rod cylinders 93 so that each cylinder may be adequately cooled by the flow of primary coolant. The wide variation in power generation per unit volume in the blanket makes it necessary to have higher surface of the rod to volume ratios and more coolant volume is required in the inner blanket region. The surface to volume ratio is obtained by using more and smaller rods in the inner blanket region and the increased coolant volume is obtained by having larger orifices 69a, 72a for the inner blanket rods than for the outer blanket rods. In the 500 and 800 liter reactors the maximum to average heat generation is of the order of 15 and the inner blanket region of these reactors is therefore approximately 6 inches thick, or two rows of blanket rods. The balance of the active portion of the reactor outside of the inner blanket is filled with the outer blanket rods.

Blanket dimensions and composition are shown for three modifications of the present reactor in Table III.

Table III

| Blanket | 50 | 500 | 800 |
|---|---|---|---|
| Blanket Dimensions: | | | |
| Height, in | 66 | 84 | 90 |
| Outer diameter, in | 66 | 84 | 90 |
| Radial blanket thickness, in | 24 | 24 | 24 |
| Upper axial blanket height, in | 24 | 24 | 24 |
| Lower axial blanket height, in | 24 | 24 | 24 |
| Total volume, cu. ft | 129.3 | 248.2 | 297.7 |
| Total volume, liters | 4,260 | 7,040 | 8,430 |
| Radial Blanket Composition (vol. percent): | | | |
| Fertile material (meat) | 70 | 70 | 70 |
| Structural material | 10 | 10 | 10 |
| Coolant | 20 | 20 | 20 |
| Axial Blanket Composition (vol. percent): | | | |
| Fertile material (meat) | 40 | 40 | 40 |
| Structural material | 10 | 10 | 10 |
| Coolant | 45 | 45 | 45 |
| Stagnant coolant | 5 | 5 | 5 |
| Inner Radial Blanket Element: | | | |
| Blanket material diameter, in | 0.630 | 0.630 | 0.630 |
| Clad thickness, in | 0.010 | 0.010 | 0.010 |
| Element O. D., in | 0.650 | 0.650 | 0.650 |
| Outer Radial Blanket Element: | | | |
| Blanket material diameter, in | 0.960 | 0.960 | 0.960 |
| Clad thickness, in | 0.020 | 0.020 | 0.020 |
| Element O. D., in | 1.000 | 1.000 | 1.000 |

The blanket is surrounded by a reflector 57 consisting of a hollow cylinder of neutron-reflecting material. In the 800 liter reactor illustrated this reflector is constructed of 51,300 pounds of graphite and the dimensions of the hollow cylinder are 98 inches internal diameter, 146 inches external diameter and 8 feet high. While the reflector is not essential to maintain the chain reaction in the active portion, it is desirable to increase the neutron economy in the blanket regions.

The reactor is surrounded by a shield which serves both as a biological shield to protect operating personnel and external equipment from radiation, and also as thermal insulation. The shield may be constructed by the conventional methods and is preferably composed of high-density concrete, containing iron punchings, barytes, colemanite, limonite, or other similar heavy metal ore. In the 800 liter reactor, the concrete shield contains 392,000 pounds of such high-density concrete.

REACTOR CONTROL SYSTEM

Control of the reactor is accomplished by varying the amount of fuel in the core region of the reactor. This is accomplished by disposing control rods 95 about the active portion, as shown in Figure 7. These control rods 95 are similar to the fuel rods 60, but consist of four sections instead of three. The four sections are the lower blanket section 96, the fuel section 97, the control section 98 and an upper blanket section 99. The lower blanket section and the fuel section of a control rod are substantially identical with the lower blanket section 64 and the fuel section 62 of the fuel rod 0. The control section is equal in length to the fuel section. The control section will be filled with primary coolant during operation of the reactor. Above the control section there is a blanket section which is similar to the upper blanket section 63 of the fuel rod 60, except that the upper and lower banks of absorber material 80 and 82 are shorter in length and consequently the entire section 99 is shorter than in the fuel rod upper blanket section 63. In other modifications, the control section can contain blanket material.

The operation of the control system is best illustrated by Figure 2. The control rod 95 is supported in the active portion of the reactor by a control connecting rod 100 through a clamp 101. The control connecting rod passes through the reactor lid 58, through the central cell cap 102 of the reactor cell and the upper end is connected with a control rod operating mechanism 103. The lower end of the control rod is not supported by the reactor base plate 70 and the reactor tip plate 71 as are the other fuel rods in the reactor, but the control rods may be lowered through apertures 104 and 105 in reactor base plates and tip plates until the control rod tip rests on the control rod seat 106. When the control rod tip rests upon the control rod seat 106, the entire fuel section of the control rod is below the fuel region of the reactor and the control rod is in its maximum "out" position. By suitable movement of the control rod operating mechanism, the control rod may be drawn upwards into the reactor so that the tip of the reactor control rod is in a plane with the tip plate of the reactor and in this position the entire fuel section of the control rod is within the fuel region of the reactor. In this position the control rod is in its maximum "in" position. By proper movement of the control rod mechanism, the control rod may assume any position between the maximum "in" and the maximum "out" positions.

Since the control rods and operating mechanism of the control rods are identical for each rod, the rods may be used interchangeably for regulating control, shim control and safety control. Regulating control is used to maintain the reactivity of the reactor at a constant level or to raise or lower the reactivity of the reactor at a relatively slow rate. Shim control is used to change the reactivity of the reactor in relatively large steps and thus to bring control of the reactor within range of control of the regulating control elements. The control rods used for shim control are most often employed to adjust for changes in reactivity of the reactor due to fuel burnup, the introduction of absorbing materials into the reactor, changes in reactivity due to temperature changes, and other changes usually of long-term duration. The control rods used for the safety control are maintained during operation of the reactor in the position giving the maximum reactor reactivity, that is, in the maximum "in" position. A change of these rods from the maximum "in" position to the maximum "out" position will thus result in a large decrease in reactivity of the reactor, thus effectively shutting down the reactor. It will be noted that, if the safety rod in the maximum "in" position is released from its operating mechanism, the action of gravity alone will effect the change of the rod's position from the maximum "in" position to the maximum "out" position. The reactor is thus protected from damage by "fail safe" safety rods. Conventional drives, safety latch releases, etc. may be used with the safety rod operating mechanism.

When the reactor is first started with a fresh batch of fuel elements in the reactor core, all of the safety control elements will be positioned in the "maximum in" position to give the reactor maximum reactivity. The control elements employed as shim control elements will be lowered to the 'maximum out" position to give minimum reactivity and the control rod elements employed as regulating rods will be positioned approximately in the center of their travel to give a neutron reproduction ratio of unity. As the reactor is operated, the multiplication factor of the reactor is reduced due to the buildup of fission products in the fission section of the reactor and the decrease in fissionable material due to burnup in this section, although this burnup is partially compensated for by the buildup of fissionable material in the reactor fuel region, and it will then be necessary to position the control elements used as shim controls in positions of greater reactivity.

While the reactor control rods are shown in Figure 6 as being positioned in the periphery of the active portion of the reactor, it will be understood that these reactor rods may be positioned elsewhere within the core and active portion of the reactor. Thus these elements, in addition to effecting the control of the reactor as previously described, may flatten the reactivity in accordance with well-established principles which are described, for example, in the copending patent application, Serial No. 649,398, "Density Control in a Neutronic Reactor," by Gale J. Young, filed February 21, 1946.

POWER PRODUCTION

The present reactor is cooled by a flow of a liquid metal, preferably sodium, through the active portion of the reactor. The reactor, the primary heat exchanger 42, the primary coolant pump 43 and all of the primary coolant 45 are contained within the unitary imperforate tank 40. In the series-flow reactor 39 illustrated in Figure 1, the liquid sodium contained in the reactor tank enters the primary coolant system through a pump inlet pipe 107 by an inlet 108, is pumped through an electro-magnetic liquid metal pump 43 and passes through a reactor inlet pipe 109 into the reactor inlet manifold 110 defined by the vertical wall 110a and horizontal wall 110b. Coolant then flows into the tips 69 of the fuel rods 60 through the orifice 69a and upwardly through these fuel rods to exit through a second orifice 72a into a reactor plenum chamber 111. The coolant then flows downwardly through the blanket rods into the reactor exit manifold 112. From this manifold 112 the primary coolant then flows through reactor exit pipe 113 to the heat exchanger 42. The primary coolant flows upwardly through the heat exchanger and leaves the primary coolant flow system through the heat exchanger exit pipe 114 containing the outlet 115 to the mass 45 of primary coolant contained in the reactor tank 40.

Figure 4:
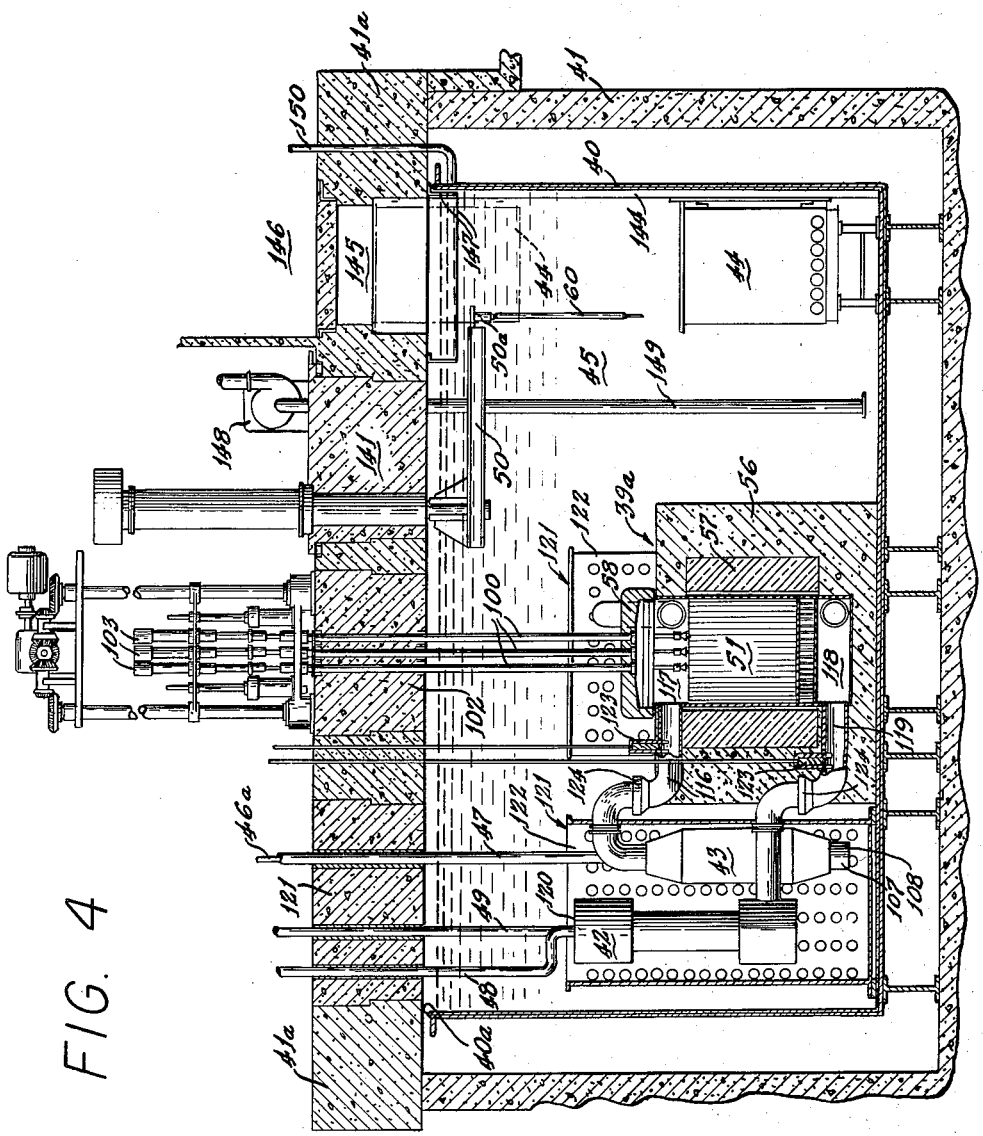
Figure 4 is a vertical sectional view taken along line 4—4 of Figure 3.

Various other flow schemes of the primary coolant are also contemplated. For example, in the parallel-flow reactor 39a, in Figures 3 and 4, the primary coolant enters the primary coolant system from the mass of primary coolant 45 by inlet 108 in the pump inlet pipe 107, passes upwardly through the primary pump 43, through the reactor inlet pipe 116, then into the reactor plenum chamber 117, then downwardly through the fuel elements, control elements and blanket elements in parallel flow to the reactor outlet manifold 118, then to the reactor outlet pipe 119 and upward to the heat exchanger 42, being discharged into the mass of reactor primary coolant 45 through an exit from the heat exchanger 120. The combination of the heat exchanger and primary coolant pump into a single unit 121 which is contained in and supported by the primary coolant unit basket 122 makes possible the removal of a primary coolant unit from the reactor cell through a primary coolant cell plug 122a in the roof of the reactor cell 41. The inlet and exit pipes of the reactor have cut off plugs 123, so that the flow of coolant to a particular primary reactor unit may be cut off. The inlet and outlet reactor pipes 116 and 119 are equipped with slip joints 124, so that the two sections are easily separable. The use of slip joints in the reactor piping system is made possible by the construction of the reactor, since the inlet and outlet pipes which carry primary coolant are completely surrounded by the reservoir of primary coolant, making the joint requirement one of control of leakage rather than the absolute exclusion required in the prior art designs. This slip joint design is aplicable to all modifications of the present invention. While four primary coolant units are shown in Figure 3, as many units as may be required by the heat production of the reactor may be positioned about the reactor.

The third, and perhaps the most important, flow modification, particularly for very large reactors, is shown in Figure 9. In the parallel-flow reactor 39b shown in this figure as in the reactor shown in Figure 1, the primary coolant enters the primary coolant system through an inlet 107 in a primary coolant pump inlet pipe 108, is pumped through the primary coolant pump 43 and then through a reactor inlet pipe 109 into a reactor inlet manifold 110. From the reactor inlet manifold the primary coolant passes up through the reactor fuel rods into a reactor plenum 111, thence through reactor outlet pipes 113 into reactor heat exchanger 42 and downwardly through the heat exchanger and out through the heat exchanger exit pipe 114 through the exit 115 into the mass of primary reactor coolant contained in the reactor tank. The parallel-flow reactor 39b differs from the series-flow reactor 39 in that in a second primary coolant system, coolant is pumped from the primary reactor mass in the reactor tank through the pump 43 and reactor inlet pipe 125 into the reactor blanket manifold 126. The coolant flows upwardly through the blanket rods into the reactor plenum chamber 111 and out through the outlet pipes 113 to primary heat exchangers 42, and thus out into the mass of reactor coolant in the reactor tank 40. As many as eight primary coolant units may be positioned around a large reactor, as shown in Figure 10, thus insuring adequate flow of primary coolant in both core and radial blanket regions without making the pump and heat exchanger units unreasonably large.

The choice of a primary and a secondary coolant for use in the present reactor is very important, not only from the heat transfer standpoint, but also from the safety standpoint. Although there are several liquid metals, such as sodium, sodium-potassium alloys, bismuth, mercury, lead-bismuth alloys, potassium, and lead, which may be used as either the primary or the secondary coolant in the present reactor, a careful survey of the advantages and disadvantages of the various potential coolants has indicated that the preferred primary coolant is sodium and the preferred secondary coolant is sodium-potassium eutectic alloy (hereafter referred to as NaK). The coolant should have good nuclear properties, especially with respect to absorption by neutrons. Of the elements which might be used as liquid heat transfer media in reactors, sodium has the lowest fast-neutron capture cross section; the cross section for fission neutrons is approximately 1.4 millibarns. Its thermal neutron capture cross section is approximately 0.45 barn ($\pm 10\%$). Since the present reactor is a fast reactor, the low value of the capture cross sections for fast neutrons is of prime importance.

The coolant must be an efficient heat transfer medium. The efficiency of a liquid as a heat transfer medium depends upon several factors such as thermal conductivity, $k$, the heat capacity, $C_p$, the density, $\rho$, and the viscosity, $\mu$. These constants can be combined into the dimensionless parameters which can be used to compare the relative heat transfer characteristics of liquids. Thus, for streamline flow, the function is $x = \mu/C_p^2\rho^2 k$, and for turbulent flow, $y = x/(C_p\mu/k)^{0.4}$. These parameters essentially measure the pumping power required for the various liquids under conditions of constant heat flux, temperature rise in the coolant, film temperature drop, residence time in contact with the solid, and similar factors. On the basis of these constants (which for liquid metals may be obtained from such standard reference books as the Liquid Metals Handbook, June 1, 1950, Atomic Energy Commission, Department of the Navy, Washington, D. C.), the tentative values of the respective coolants may be quantitatively determined.

For example, it is obviously advantageous to keep the capacity of the coolant flow system at a minimum. This depends upon the pumping power required to move the amount of the fluid required to give satisfactory heat transfer through the system, the coolant velocity and the size of the inlet and discharge headers. Of the liquid metals concerned, sodium is best with respect to pumping power, NaK the next best, with bismuth, mercury, lead-bismuth, potassium and lead following in that order. Sodium is nearly as good as liquid water with respect to pumping power and 18,500 times as good as steam at 10 atmospheres with respect to pumping power. Good thermal conductivity, high heat capacity, low density and low viscosity are characteristics of sodium. These characteristics of sodium also tend to limit the maximum temperature of the reactor parts and maximum thermal stresses in the reactor parts, since a very small temperature gradient may be maintained between the fuel and across the fuel cladding and film temperature drop. The good heat transfer coefficient and high thermal conductivity of sodium also tend to avoid the problem of excessive heating of points within the reactor where the primary coolant is stagnant. This problem, which has been acute in water-cooled reactors because of the low thermal conductivity of water in a stagnant condition, is avoided by the use of sodium or NaK.

The liquid metal coolants are very stable with respect to changes due to high temperature and nuclear irradiations because of their monoatomic character. Sodium has a melting point at atmospheric pressure of 98° C. This, however, is not a serious disadvantage where sodium is used as a primary coolant in the reactor of the present design, since all of the sodium is maintained at all times within the reactor tank. During operation of the reactor, and for a considerable time after shutdown, the reactor furnishes enough heat to maintain the entire mass of sodium at a temperature above the melting point. For the initial startup, and for very long shutdown periods, the sodium in the reactor tank can be heated above its melting point very conveniently by introducing hot gases into the wall of the reactor tank.

The preferred coolants for the secondary cooling system are sodium-potassium alloys, and particularly the sodium-potassium eutectic alloy, which has a melting point of 19° C. Although this alloy requires slightly more pumping power than sodium, is somewhat more expensive, and has a lower boiling point (825° C. as against 883° C. for sodium), these disadvantages are outweighed by the advantage of being able to operate the power plant without using auxiliary heaters in the secondary coolant system. For reactor power plant installations in extreme climates, where it would be desirable to have a secondary coolant with an even lower melting point, there are other sodium-potassium alloys which have even lower melting points, which could be used; for example, the 56 wt. percent sodium-44 wt. percent potassium alloy has a melting point of −11° C.

Sodium does become highly radioactive as a result of neutron irradiation. This, however, is not a severe problem, since the sodium is retained within the reactor cell, the walls of which are constructed to give adequate shielding. The NaK secondary coolant is shielded from the reactor active portion by the reflector and reactor shield, so that it remains substantially nonradioactive. Shielding is therefore not required for the power-producing apparatus and piping which are outside of the reactor cell.

Both sodium and NaK are very satisfactory from the standpoint of corrosive attack on structural materials. As pointed out in the Liquid Metals Handbook, 1950 edition, page 88 et seq., there are a large number of ordinary structural materials which can be used successfully as containers for sodium and NaK, even at elevated temperatures. For example, the 18–8 stainless steels, types 347, 304 and 316 stainless steels, zirconium, zirconium alloys, titanium and titanium alloys are suitable container materials for these materials at elevated temperatures. Both sodium and NaK do have the problem that they react violently and explosively with water vapor and moist air. It is therefore essential that they be handled under an inert atmosphere, such as nitrogen, argon or helium. It is contemplated in the present reactor that the reactor cell be sealed with helium or similar gas and that the piping, makeup tanks, etc. be maintained under helium. There has been considerable use of sodium and sodium-potassium alloys in high-temperature heat-transfer applications in recent years and conventional methods of handling these materials have been developed. The state of this art is discussed at considerable length in such publications as Liquid Metals Handbook, ibid.

The primary coolant pumps illustrated are direct current electromagnetic pumps. This type of pump, which has been described in such copending applications as Serial No. 364,114, "Direct Current Electromagnetic Pump," by Arthur H. Barnes, filed June 25, 1953, now Patent No. 2,811,923, is particularly suitable for use in the present system, since these pumps have no moving parts, no packing, and essentially no electrical insulation, and hence are capable of operating at high temperature and in intense radiation fields. This pump is also particularly suitable since it presents substantially no hindrance to flow of coolant through the pump induced by convective forces when power is cut off from the pump. This type of pump operates at very low voltage. High currents are required and these may be supplied to the pump, for example by homopolar generators 46 installed above the top shield 41a. The current is conveyed from the generator to the pump by means of bus bars 46a enclosed in conduits 47. Adequate insulation of the bus bars from the conduit is provided by positioning the bus bar in the conduit so that there is a gas filled annular separation between the bus bar and the conduit wall.

The piping connecting the pumps, heat exchanger and reactor may be of a conventional stainless steel or other suitable heat-resistant alloy. Because of the relatively short length of piping involved and the high temperature of the primary sodium coolant 45 in the reactor tank 40, uninsulated piping may be used. More efficient power transfer, however, may be effected if the piping is insulated from the primary coolant mass 45. The reactor shield 56, while primarily a radiation shield, also serves as insulation for the reactor active portion and prevents excessive heat radiation directly from the reactor active portion to the mass of primary coolant contained in the reactor tank. The heat exchanger 42 is of conventional design, having high heat exchange capacity and being constructed of material resistant to corrosion by sodium and NaK at high temperatures, for example stainless steel.

The heat production of various modifications of the reactor of the present invention has been determined. The reactors considered are the 50 liter, 500 liter, and 800 liter reactors and the determination was made with reference to a series-flow modification. In the series-flow modification illustrated in Figures 1 and 2, the primary coolant enters the core from the inlet manifold 110, flows upwardly through the core into the plenum 111, and then downwardly through the blanket 53 into the exit manifold 112. The reactor is considered as operating at average power. The pertinent figures are shown in Table IV.

Table IV

| Heat Production | 50 | 500 | 800 |
| --- | --- | --- | --- |
| Core: | | | |
| Total Mw | 50 | 750 | 800 |
| Specific density, Mw./kg. (of thermally fissionable material) | .55 | 2.5 | 1.8 |
| Power density, Mw./l | 1.0 | 1.5 | 1.0 |
| Blanket Power: | | | |
| Total Mw | 12.5 | 133 | 140 |
| Power density, Mw./l | .0034 | .02 | .016 |
| Total Reactor Power, Mw | 62.5 | 883 | 940 |
| Fuel Rod: | | | |
| Cooling surface, sq. ft | 198 | 1,700 | 3,160 |
| Average heat flux, B. t. u./(sq. ft.) (hr.) | $0.875 \times 10^6$ | $1.5 \times 10^6$ | $0.875 \times 10^6$ |
| Maximum heat flux, B. t. u./(sq. ft.) (hr.) | $1.31 \times 10^6$ | $2.25 \times 10^6$ | $1.25 \times 10^6$ |
| Radial Blanket Element: | | | |
| Cooling surface, sq. ft | | 4,150 | 4,880 |
| Average heat flux, B. t. u./(sq. ft.) (hr.) | | 79,000 | 70,000 |

The pertinent data with respect to the removal of heat from the reactor active portion are shown in Table V. The reactor sizes refer to the volume of the active portion of the various reactors. The reactors considered are the series-flow reactors as previously described and the primary coolant is sodium. It is assumed that there is no heat loss in the piping or to the surfaces of the manifolds or the pump walls. Thus the temperature of the bulk sodium is assumed to be the same as that of the inlet manifold, which is shown in the table as "coolant inlet temperature." The reactor exit temperature is assumed to be the same as the heat exchanger inlet temperature.

Table V

| Heat Removal (series flow) | 50 | 500 | 800 |
| --- | --- | --- | --- |
| Core: | | | |
| Coolant flow area, sq. ft | 0.67 | 3.55 | 4.30 |
| Maximum coolant velocity, F. P. S | 35 | 35 | 35 |
| Core coolant flow rate, G. P. M | 9,000 | 52,500 | 63,000 |
| Core coolant inlet temperature, °F | 822 | 653 | 618 |
| Average coolant temperature rise, °F | 142 | 380 | 324 |
| Core exit coolant temperature, °F | 964 | 1,033 | 942 |
| Maximum temperature clad surface, °F | 1,025 | 1,175 | 1,025 |
| Maximum fuel alloy temperature, °F | 1,390 | 1,780 | 1,325 |
| Blanket: | | | |
| Coolant flow area, sq. ft | 4.3 | 6.28 | 6.90 |
| Flow velocity, F. P. S | 24 | 18.5 | 20.0 |
| Average temperature rise, °F | 36 | 67 | 68 |
| Total Na coolant temperature rise, °F | 178 | 447 | 382 |
| Total Na flow rate, lbs./hr. $\times 10^6$ | 3.64 | 22.2 | 26.7 |
| Reactor inlet Na temperature, °F | 822 | 653 | 618 |
| Reactor exit Na temperature, °F | 1,000 | 1,100 | 1,000 |
| Heat exchanger inlet temperature, °F | 1,000 | 1,100 | 1,000 |
| Heat exchanger exit temperature, °F | 822 | 653 | 618 |

The heat exchanger in the secondary heat transfer system may be of entirely conventional design.

Figure 29:
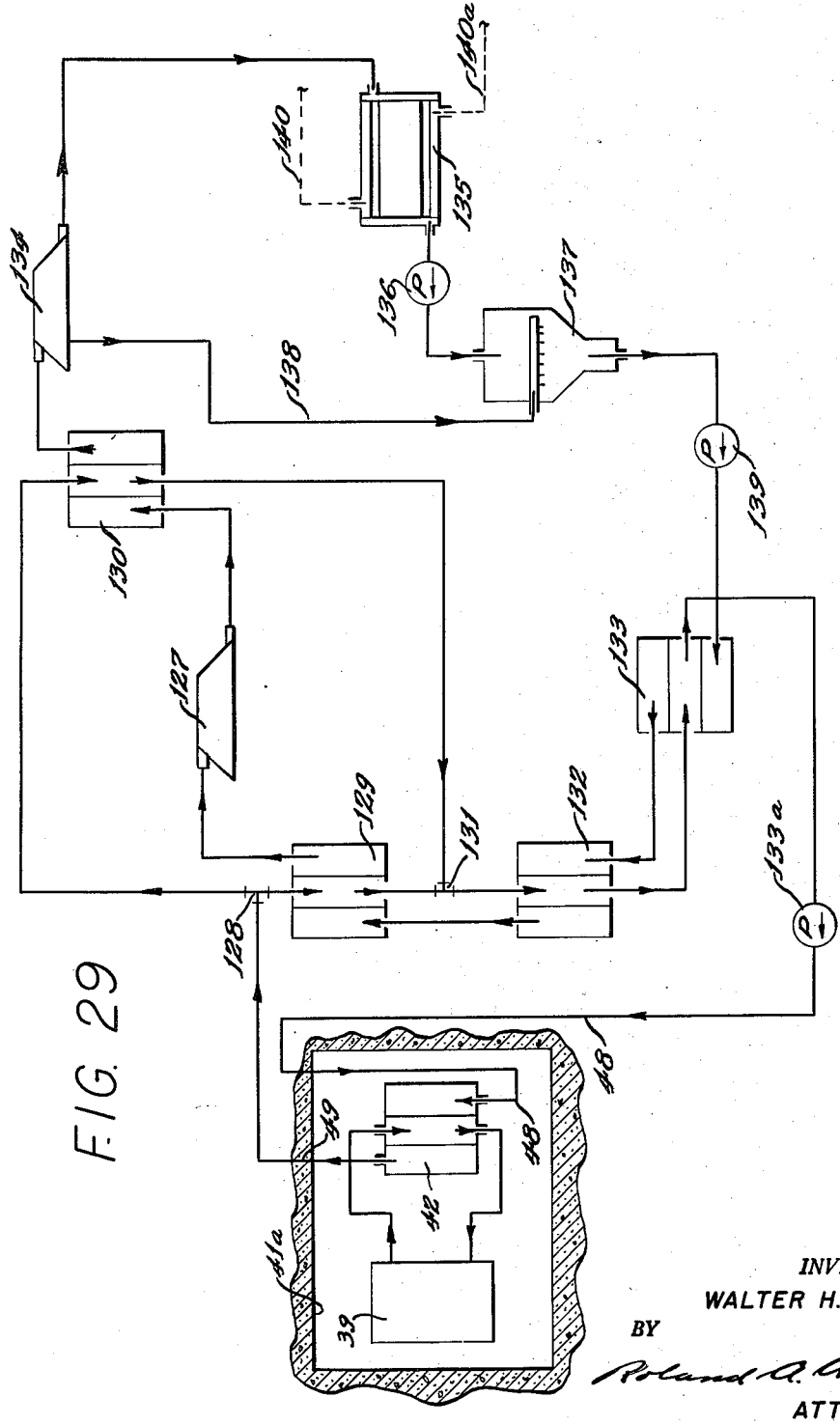
Figure 29 is a schematic diagram of the flow of coolants and steam in and between a reactor and a typical associated power production apparatus.

The steam generation system is entirely conventional and is accordingly schematically illustrated in Figure 29. The secondary coolant flows from the primary heat exchanger 42 through an exit pipe 49 which passes through the shield 41a. The flow of secondary coolant from the primary heat exchanger is divided at junction 128. The major part of the secondary coolant flows through the super heater 129, while a smaller portion flows to the reheater 130 and back to the main flow of the secondary coolant at junction 131. A major portion of the secondary coolant flows from the super heater 129 to the boiler 132 and then through the feed water heater 133 and the secondary coolant pump 133a to the inlet pipe 48 of the primary heat exchanger 42.

The steam which is generated in the boiler 132 is superheated in the super heater 129 and then flows to the high-temperature turbine 127. The exhaust from the turbine flows through the reheater 130 and thence to the low-pressure turbine 134. The exhaust from the low-temperature turbine is condensed in condenser 135 which is cooled by a water line 140 and 140a. The condensate is pumped by pump 136 to an open heater 137 where it is heated by steam introduced by a bleed line 138 from the low-temperature turbine 134. The partially heated water is then pumped by a second pump 139 through the feed water heater 133 and thence into the boiler 132. Construction of the super heater is of the double tube type, which provides a space between the tubes for safety in case of a leak of steam, water or NaK. The use of the usual accessories for liquid metal heat transfer systems maintenance, such as cold traps and filters for removing impurities from the system, and a dry helium or argon gas blanket are required. These, however, are conventional in liquid metal heat transfer systems.

While a reheat cycle has been illustrated, other conventional high-temperature, high-efficiency steam generator systems may be employed. The reheat cycle is particularly efficient, however, with a liquid metal plant, because the liquid metal can be piped to the reheater which can be located very close to the turbines, whereas steam conventionally make a round trip to and from the boilers in a fossil fuel plant. The liquid metal has a high density and low pressure as compared to the steam; hence the piping is small.

The electrical energy production is summarized in Table VI.

*Table VI*

| Power Production | 50 | 500 | 800 |
|---|---|---|---|
| Primary Heat Exchanger: | | | |
| Temperature NaK in, °F | 770 | 603 | 568 |
| Temperature NaK out, °F | 950 | 1,050 | 950 |
| Total NaK flow rate, lbs./hr.×10⁶ | 4.76 | 32.2 | 39.2 |
| Velocity, ft./sec. | | 5 | 5 |
| Total heating surface, sq. ft. | 6,500 | 53,000 | 56,000 |
| Number of units | 1 | 8 | 8 |
| Performance of Each Unit: | | | |
| Heat transferred/unit, Mw | 110 | 110 | 115 |
| Over-all heat transfer coefficient, B. t. u./(hr.) (sq. ft.) (°F.) | 1,330 | 1,330 | 1,330 |
| Log mean temperature difference, °F | 50 | 50 | 50 |
| Effective heating surface, sq. ft. | 5,670 | 5,670 | 5,910 |
| Total heating surface, sq. ft. | 6,560 | 6,560 | 7,000 |
| Steam Conditions (turbine throttle): | | | |
| Steam temperature, °F | 900 | 1,000 | 900 |
| Steam pressure, p. s. i. a. | 1,800 | 1,800 | 1,800 |
| Steam flow rate, lbs./hr.×10⁶ | 0.19 | 2.34 | 2.58 |
| Steam Cycle: | | | |
| Reheat temperature, °F | 900 | 1,000 | 900 |
| Reheat pressure, p. s. i. a. | 450 | 450 | 450 |
| Extraction pressure, p. s. i. a. | 100 | 100 | 100 |
| Feedwater temperature, °F | 400 | 400 | 400 |
| Steam Conditions (exhaust): | | | |
| Pressure—in Hg abs. | 2 | 2 | 2 |
| Temperature, °F | | 101 | 101 |
| Moisture, percent | | 4.5 | 7.2 |
| Electrical Energy Production: | | | |
| Reactor power, Mw | 62.5 | 883 | 940 |
| Efficiency, percent | 24 | 34 | 32 |
| Electrical power, Mw | 15 | 300 | 300 |

REACTOR OPERATION

The loading and unloading of the reactor is effected by means of a jib crane 50. A crane hook 50a is adapted to engage rod hangers 67. The crane plug 141 is rotatable so that the crane hook can engage any rod in the reactor active portion and transfer it to any position in the rod storage tanks 44 without raising the rod above the level of the primary coolant 45 in the reactor tank 40.

The storage tank platform 142 is provided for the storage tanks to rest upon. The storage tanks are attached to a tank elevator 143 which moves upon ways 144, so that the storage tanks may be raised and placed in conjunction with storage tank plug openings 145. Auxiliary equipment is provided to remove rods from the elevated storage tanks into the processing room 146. A baffle 147 extends from the cell roof 41a below the surface of the primary coolant 45 in the reactor tank 40 to prevent loss of the inert gas atmosphere in the reactor cell. The drain pump 148 and suction line 149 are provided for removing the sodium from the reactor tank 40. The drain line 149 may be removed from the reactor cell when not in operation. The tank 40 has a gas line 150 so that the space between the walls of the reactor tank may be evacuated during operation of the reactor or the line can be used to introduce hot gases to warm the primary coolant above its melting temperature after long periods of reactor shutdown. Evacuation of the space between the walls of the reactor tank 40 also serves as thermal insulation during operation.

SAFETY

Nuclear reactors which are designed to produce power in quantities sufficient to make them competitive with conventional power plants of the "central station" type should be capable of producing very large quantities of power, of the order of 500–800 mw. Furthermore, since central station power plants are normally located in densely populated areas, a power reactor of this type must be safe. However, a power reactor of this type will constitute a tremendous source of radiation, containing of the order of billions of curies.

The radioactive fission products are the primary source of the radiation in the core of the reactor after shutdown. It may also be pointed out that a nuclear reactor will continue to produce substantial amounts of power and of radiation even after the reactor is shut down, so that the hazard from the radiation and heat effects of a reactor is not removed by shutdown of the reactor. Even a fairly small reactor will contain a sufficient amount of fission products so that if these fission products are released, for example by vaporization of the core, they would make a large area uninhabitable for long periods of time. For example, if all the radioactivity in a 250 mw. reactor were released, a surrounding area 10 miles in diameter might be subject to such intense irradiation that some 15% of the population would receive a fatal dose. The catastrophic nature of such a release of radioactivity in the center of a large city is obvious. Now, not only is there a radiation hazard from the fission products contained in a power reactor, but there is also a serious hazard from the poisonous nature of plutonium contained in such a reactor. For example, only 750 grams of plutonium is enough to contaminate one square mile of watershed to the tolerance limit for 30 years. Thus a reactor designed for central station power operations must have a maximum inherent safety. Certain novel features of the reactor of the present invention are concerned with obtaining this maximum safety required of a central station power reactor.

Perhaps the greatest hazard from a reactor would result from the complete loss of coolant. Should a reactor operating at the high power level contemplated for the present reactor completely lose its coolant liquid, the fission product heat which would continue to be generated would completely melt and vaporize the fuel elements within a matter of a very few minutes. The design of the present reactor avoids this possibility under any conceivable sets of circumstances. This is done by immersing the reactor and primary heat exchanger in a heavy double-walled imperforate tank filled with the primary coolant. The tank has no openings in the wall or bottom which could be subject to leaks. Furthermore, the tank is preferably contained in a concrete-walled pit or reactor cell below the ground surface and having no openings in the wall or floor of the pit. Therefore, even if the reactor tank should be ruptured by an earthquake, or an explosion induced by sabotage, or by other methods, the concrete-walled pit or cell would act as a secondary container. The design of the system whereby the primary heat exchangers are immersed in the coolant pool, so that the primary coolant never leaves the pool, also protects against possible losses of primary coolant. Additional protection against any possible breach of the tank could be obtained by evacuating the core of the double-walled tank during operation of the reactor and connecting this core with a leak detection system which would detect any presence of sodium. In case it became necessary during maintenance of the reactor to remove the coolant, this could be accomplished by inserting a pipe into the tank and pumping the coolant out. The removable outlet pipe should be connected with an interlock system which would prevent its use during operation of the reactor and thus would prevent any possible accidental discharge of the primary coolant during operation.

The design of the present reactor, whereby the primary coolant always remains within the reactor tank, also simplifies the protection of personnel against normal radiation of the reactor. It is contemplated that certain of the primary coolants which may be used with the present reactor, for example sodium, will become highly radioactive from the neutron irradiation received as the coolant moves through the reactor. Since the primary coolant is always contained within the reactor tank, it is fairly simple to construct a concrete shell around the reactor tank which will form an effective biological shield for operating personnel. The secondary coolant which enters the reactor tank is shielded from neutron irradiation by the shielding of the reactor core, so that it will never become substantially radioactive. Therefore the external piping and the secondary heat exchanger system need not be shielded, thus greatly simplifying the shielding problem and maintenance of the secondary heat exchanger system.

Figure 31:
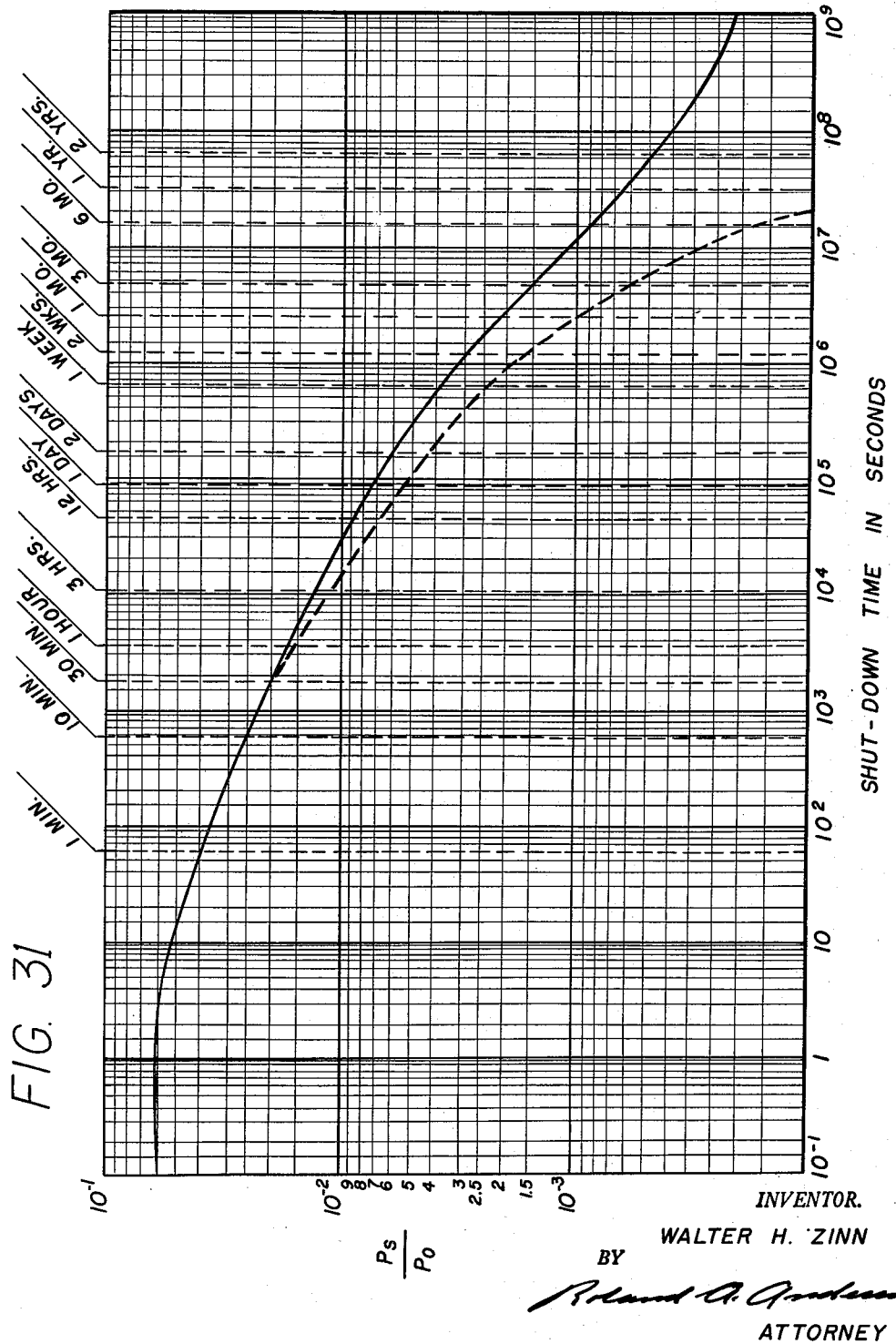
Figure 31 is a graphic representation of the heat production of an irradiated fuel rod after shutdown of a reactor.

Now, while perhaps the most acute hazard associated with a high power reactor is connected with the complete loss of the coolant, there is also a serious potential reactor hazard connected with an emergency shutdown. For the purpose of the present discussion, an emergency shutdown is considered as an abrupt stopping of the fission reaction in the reactor accompanied by a complete loss of pumping power both in the primary coolant cycle and in the secondary coolant cycle. This might result from an electric power failure which would cut off the electric power to operate the pumps in both coolant cycles. The substantial energy released from the radioactive decay of the fission products which are present in the reactor fuel after shutdown of the fission process has been discussed in several publications, for example, Radiations from Fission Products, K. Way and E. P. Wigner, Phys. Rev. 70: 115 (1946). The energy produced will, of course, depend upon the amount of radioactive fission products in the reactor which, in turn, depends upon the length of time the fuel has been irradiated in the reactor. However, for fuel which has been irradiated any substantial period of time, the energy produced, at least in the first few days, after a shutdown, will be substantially the same. An equation for the heat production of a reactor after shutdown, which has been developed, is $$\frac{P_s}{P_o} = [0.1(T_s+10)^{-0.2} - 0.87(T_s+2\times 10^7)^{-0.2}] - 0.1[(T_s+T_o+10)^{-0.2} - 0.87(T_s+T_o+2\times 10^7)^{-0.2}] \quad (1)$$

where $P_o$ is the heat production during operation, $P_s$ is the shutdown heat, $T_o$ is irradiation time, and $T_s$ is the time after shutdown. Figure 31 is a graphic representation of the energy production in uranium fuel after shutdown of the reactor. The solid line represents the energy production in a fuel element which has been irradiated for an infinite time and the dashed line represents the energy generation in a fuel element which has been irradiated for 120 days. The term "power after shutdown" or "$P_s$" refers to the energy generated by this radioactive decay after the reactor has been shut down. This is distinguished from operating power "$P_o$" which refers to the power generated in the reactor during operation, primarily as a result of the fission process. As shown by the figure, at the instant of shutdown the reactor power drops from the operating power, or 100%, to a shutdown power of approximately 6% of the operating power, and as the radioactive decay takes place this shutdown power gradually tapers off. Since the energy produced after shutdown is generated by radioactive decay, a process which cannot be affected or changed by known physical methods, there is no method of lessening or controlling this heat generation in a reactor. In a power reactor operating at a power greater than about 500 mw., the quantity of heat generated after shutdown will be tremendous and this heat must be removed from the reactor after shutdown in order to avoid a dangerous rise in temperature of the reactor and surroundings. A rise in temperature in the reactor and surroundings which is unchecked will eventually melt and vaporize the fuel rods of the reactor.

Since the radioactive decay process cannot be stopped and the heat generated after shutdown must be removed before vaporization of the coolant takes place, it is necessary that there be a reasonable interval of time between shutdown and vaporization of the coolant in which to provide for removal of the heat, either by repairs to the normal reactor coolant system or by introduction of an auxiliary cooling system. If this time interval between shutdown and vaporization of the coolant is very short, for example of the order of minutes, the reactor safety factor will obviously be much less than if the time is longer, for example a period of hours.

A quantitative evaluation of this safety factor has been proposed for the purpose of comparison of various reactors and is termed the emergency shutdown safety factor, or ESSF. It is based upon the interval between shutdown and the time the reactor primary coolant in contact with the fuel elements will commence to boil. In calculating the factor it is assumed that the reactor has been operating at design power level for a sufficient time to build up a substantial concentration of fission products. Certain simplifications are introduced, for example the time interval is calculated without regard to the heat capacity of the system, except that of the primary coolant. A reactor having an emergency shutdown safety factor of one would be a reactor in which the coolant in contact with the fuel elements would not start boiling for at least one hour after shutdown. While the real safety of a reactor is not necessarily rigidly correlated to the ESSF of the reactor, it is believed that all reactors, except perhaps low-power experimental reactors in isolated locations, should have an ESSF of at least one, and the ESSF of high-power reactors in urban locations should preferably be greater than about four.

The 800 liter reactor having 1,110,000 pounds of sodium as primary coolant has an emergency shutdown safety factor considerably greater than four hours. The large ESSF is achieved through the cooperation of several factors, particularly the choice and quantity of coolant, the open circuit primary coolant system contained in the reactor tank, the configuration of reactor coolant channels and external primary coolant piping, and the choice of primary coolant pump.

The use of sodium as a primary coolant gives a fluid with high heat capacity, low inertia and low vapor pressure and very high boiling point. The reactor tank construction makes available a very large mass of sodium at the reactor, instantly available for emergency cooling, since it surrounds the reactor and is automatically maintained in a liquid state by the heat generated in the reactor. The configuration of the reactor and the external circuit of the primary coolant system makes the entire volume of the primary coolant available for dynamic cooling of the reactor after shutdown, with the flow of primary coolant maintained through the reactor solely by convective forces. The design features of the present system which make this convective flow possible will be apparent from the description of convective flow in the modifications shown in Figures 9 and 30, which follows.

The coolant channels through the fuel and blanket rods are vertical or have a predominantly vertical component. The heat generated in the rods will therefore cause a change in density of the sodium in the coolant channels, and the vertical position of the channels will permit the sodium to move in an upward direction through the coolant channels, thus exerting a strong and continuous thrust upon the sodium within the piping and walls of the enclosed portions of the primary coolant system. The inlet of the primary coolant is beneath the surface of the primary coolant in the reactor tank; the piping of the inlet system is short since the primary coolant surrounds the reactor, and the pump is a low-resistance pump, that is, of a type offering little resistance to the free flow of liquids. The electromagnetic pump illustrated in the inlet leg offers no more resistance to the flow of coolant than would a similar length of pipe, so that there is no impediment to the flow of the primary coolant in the inlet leg and little frictional drag.

The outlet leg of the primary coolant system is also short, and the heat exchanger contained in this leg offers little resistance to the flow of the coolant. Since the primary coolant is an open circuit, that is, it has an inlet and an outlet into the mass of the primary coolant in the reactor tank, below the surface of the coolant, the entire volume of the coolant in the reactor tank is free to circulate through the primary coolant system. The open structure of the tank will permit convective currents to flow within the tank itself, thus insuring a fairly uniform temperature of the sodium in the tank, even during prolonged temperature increases.

Although the circulation head induced by the heat produced in the reactor fuel region after shutdown is sufficient to overcome the frictional drag, etc. throughout the entire primary coolant circuit and insure convective flow throughout the primary coolant system, as will be later demonstrated, the frictional drag in the system can be greatly decreased by raising the lid 58 of the reactor active portion. Although the lid-lifting mechanism is ordinarily power operated, it is designed so that the lid may be mechanically raised by the operating personnel in case of power failure. It can also be counterbalanced and interlocked to the control system, so that it would be automatically raised by gravity in case of emergency shutdown. It would be particularly desirable to raise this lid in case of emergency shutdown in the reactor flow modifications shown in Figures 1 and 3.

The above qualitative description of the emergency shutdown safety factor and the structure of the present invention which results in a large ESSF for the present reactor may be further illustrated by the following quantitative determination of the ESSF of a reactor of the present design, and its comparison with the ESSF of a conventional reactor of identical size, but having a closed circuit primary cooling system, instead of the open circuit system of the present invention.

Figure 30:
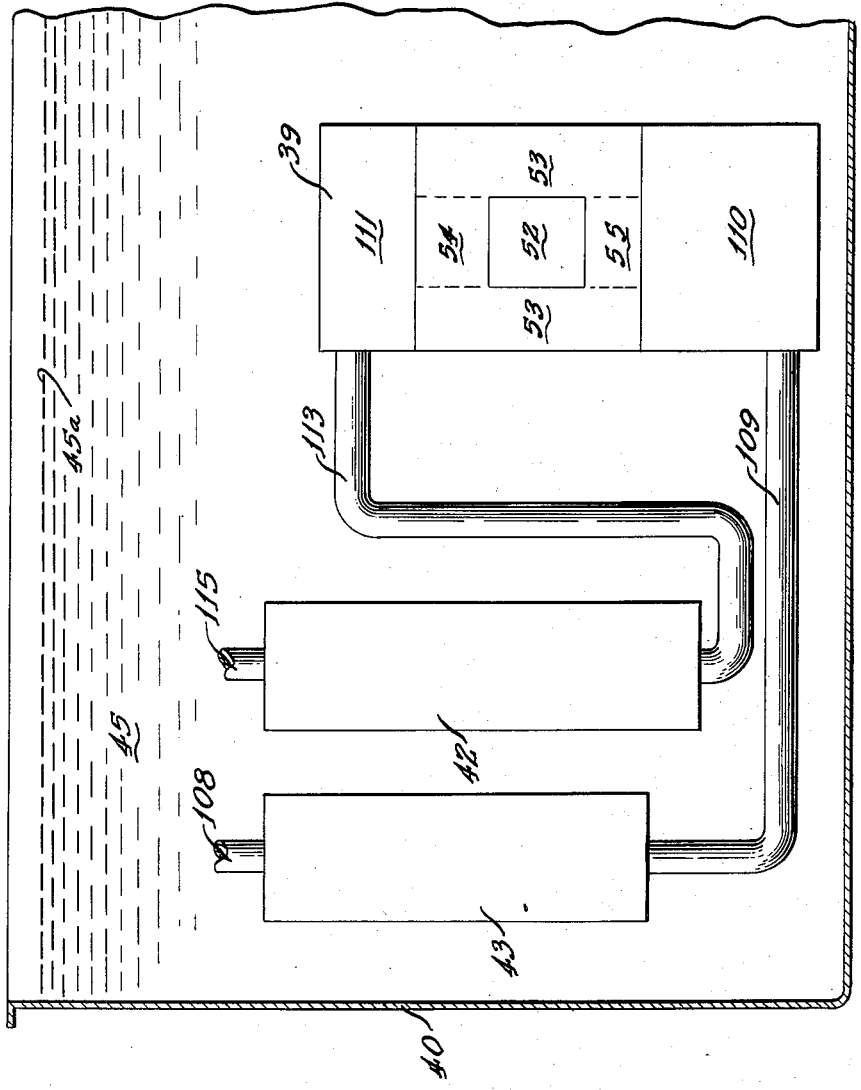
Figure 30 is a diagrammatic view illustrating the configuration of the reactor and associated primary coolant system in the parallel upward-flow reactor.

Certain assumptions have been made which it is believed would not substantially affect the relative difference between the ESSF's for the two reactors. It is assumed that when shutdown occurs the primary pumps fail in operation and there is a power failure of the secondary coolant cycle resulting in a complete loss of pumping power in that cycle also. The reactor of the type shown in Figures 9 and 10 is assumed, in which there are eight external circuits. The external flow, however, is assumed to be that of the diagrammatic view of Figure 30. The reactor is assumed to be operating immediately before shutdown at a power of 883 mw. The mass of sodium in the tank and coolant channels is assumed to be 1,110,000 lbs. The total flow rate of sodium through the reactor is assumed to be $22.2 \times 10^6$ lbs./hr. or 117.5 cu. ft./sec. at full operating power, with the primary and secondary pumps running. The average temperature of the core $t_1$ is assumed to be 843° F., the average temperature $t_2$ in the manifold of the core or core plenum to be 1033° F., the average temperature $t_3$ of the heat exchanger to be 843° F., and the average temperature $t_4$ of the sodium in the inlet to the core to be 653° F. The reactor fuel element is assumed to be that shown in Figure 11 with a pressure drop due to friction as shown in Table I. The piping of the external circuit is assumed to be 12-inch schedule 40 pipe and of the configuration shown in the diagram in Figure 30. The pump is considered to be of the electromagnetic liquid metal type which may be regarded as a straight pipe for the purposes of calculating friction pressure drops. The total pressure losses due to pipe friction, form losses, etc. throughout the primary coolant circuit of the sketch of Figure 30 are shown in the following table which shows the pressure drop at full power flow rate. The $\rho'$ indicates a density of the coolant at a temperature other than that developed at full power.

*Table VII*

| | |
|---|---|
| $\Delta P_1$ Pressure drop through fuel rods (from reactor inlet manifold 110 to reactor plenum chamber 111) | $\left(\frac{P_1}{P_1'}\right)$ lbs./sq. ft. $\Delta P_1 = 11,550 \left(\frac{P_1}{P_1'}\right)$ |
| $\Delta P_2$ Pressure drop from reactor plenum chamber 111 to heat exchanger 42 | $\left(\frac{P_2}{P_2'}\right)$ lbs./sq. ft. |
|   Contraction to pipe 113 loss | 149.5 |
|   Pipe friction loss (20.75 ft. of 12" pipe) | 93.7 |
|   Three 90° elbows | 540 |
|   Expansion from pipe 113 to heat exchanger | 299 |
|   Total $\Delta P_2$ | $1,082.2 \left(\frac{P_2}{P_2'}\right)$ lbs./sq. ft. |
| $\Delta P_3$ Pressure drop through heat exchanger 42 | $\Delta P_3 = 1,440 \left(\frac{P_3}{P_3'}\right)$ lbs./sq. ft. |
| $\Delta P_4$ Pressure drop from heat exchanger 42 to reactor inlet manifold 110 | $\left(\frac{P_4}{P_4'}\right)$ lbs./sq. ft. |
|   Expansion from heat exchanger | 281 |
|   Contraction to pump | 140.5 |
|   Friction loss in pump and pipe 109 (19.75 ft.) | 84 |
|   One 90° elbow | 169 |
|   Expansion to reactor inlet manifold | 281 |
| | $955.5 \left(\frac{P_4}{P_4'}\right)$ lbs./sq. ft. |

The total pressure drop throughout the circuit due to friction losses may be summarized, then, by the following formula.

$$\Delta P_T = \left(\frac{W'}{W}\right)^2 \left[11,550 \frac{\rho_1}{\rho_1'} + 1082 \frac{\rho_2}{\rho_2'} + 1440 \frac{\rho_3}{\rho_3'} + 956 \frac{\rho_4}{\rho_4'}\right] \quad (2)$$

In the formula $\Delta P_T$ is the total pressure drop at any flow rate $W'$ of the primary coolant. $W$ is the flow rate of the coolant at full design operating power, $\rho_1$ is the density of the primary coolant at the average temperature of the reactor core, $\rho_2$ is the density of the reactor coolant at the reactor core outlet, $\rho_3$ is the average density of the coolant in the heat exchanger, and $\rho_4$ is the density of the coolant at the inlet to the reactor at flow rate $W$.

The $\rho$'s are the densities of the coolant at flow rate W'. The density-temperature equation for sodium which is used is $$\rho = 59.7 - 0.00852t \text{ lbs./ft.}^3 \quad (3)$$

where $t$ is in degrees F. The circulation resulting from the natural convection is then determined. It may be considered, upon the basis of the configuration of the primary flow current shown in Figure 30 and upon the given dimensions, that there is a column of sodium 2½ ft. high at density $\rho_1$ plus a column of sodium 13¼ ft. high of density $\rho_2$, which are balanced against a column of 15¾ ft. of sodium at density $\rho_4$. The circulation head due to convective forces then becomes $$\Delta P_C = (15\tfrac{3}{4} \times \rho_4) - (+2\tfrac{1}{2} \cdot \rho_1 + 13\tfrac{1}{4} \cdot \rho_2) \quad (4)$$

$$= 15.75\rho_4 - 2.5\rho_1 - 13.25\rho_2 \quad (5)$$

By substituting the temperature-density equation for sodium for $\rho$ the equation then becomes $$\Delta P_C = 0.0213t_1 + 0.113t_2 - 0.134t_4 \text{ (lbs./ft.}^2\text{)} \quad (6)$$

The temperature relationships are $$t_1 = \frac{t_2 + t_4}{2} \quad (7)$$

$$t_2 - t_4 = \frac{q}{WC_p} \quad (8)$$

where $q$ = the rate of heat transfer in B. t. u./hr., $W$ = the mass rate of flow in lbs./hr. which is $22.2 \times 10^6$ for the present reactor at full power, and $C_p$ = the heat capacity of the primary coolant, sodium, which is 0.3. The following equations are thus derived, $$t_2' = t_4 + \frac{q}{6.65 \times 10^6}\left(\frac{W}{W'}\right) \quad (9)$$

$$t_4' = t_4 + \frac{Q}{mC_p} \quad (10)$$

Since the mass of sodium in the tank, $m$, equals 1,110,000 lbs., Equation 10 resolves to $$t_4' = t_4 + 3Q \times 10^{-6} \, ^\circ\text{F.} \quad (11)$$

where Q is in B. t. u. Values for various times after shutdown of the pertinent temperatures and densities, or the solution of the $\Delta P_C$ equation and the solution of the $\Delta P_T$ equation, may then be calculated, as shown in the following table. Table VIII contains a tabulation of the factors in Equation 6 for various flow rates, immediately after shutdown, and Table IX contains the tabulation of the factors in Equation 2 for the flow rates immediately after shutdown.

The heat production after shutdown is determined from the dotted curve of Figure 31. It is assumed that the fuel rods have been in use for 120 days so that immediately after shutdown $P_S/P_0 = 0.06$. The instantaneous heat production of the reactor immediately after shutdown is therefore shown by the following equation $$q = 0.06 \times 883{,}000 \times 3413 = 181 \times 10^6 \text{ B. t. u./hr.} \quad (12)$$

The temperature $t_4$ of the coolant in the tank has been established as 653° F. and the density of the coolant in the tank at shutdown is therefore 54.1.

Table VIII

| (1) $\frac{W}{W'}$ | (2) $t_2$ $653+27.2\times(1)$ | (3) $t_1$ $\frac{653+(2)}{2}$ | (4) $.113 t_1'$ | (5) $.0213 t_2'$ | (6) $\Delta P_C = (4)+ (5)-87.7$ lbs./ft.$^2$ |
|---|---|---|---|---|---|
| 10 | 925 | 789 | 104.5 | 16.8 | 33. |
| 15 | 1,061 | 857 | 119.9 | 18.3 | 50.5 |
| 20 | 1,197 | 925 | 135.3 | 19.7 | 67.3 |
| 25 | 1,333 | 993 | 150.6 | 21.2 | 84.1 |
| 30 | 1,469 | 1,061 | 166.0 | 22.6 | 100.9 |

Table IX

| (1) $\frac{W'}{W}$ | (2) $\left(\frac{W'}{W}\right)^2$ | (3) $\frac{606\times 10^3}{\rho_1'\times 10^{-3}}$ | (4) $\frac{130\times 10^3}{\rho_2'\times 10^{-3}}$ | (5) $\frac{51.7\times 10^3}{\rho_4'\times 10^{-3}}$ | (6) $\Delta P_t(2)[(3)+(4)+(5)]$ lbs./ft.$^2$ | $\rho_2$ | $\rho_1$ |
|---|---|---|---|---|---|---|---|
| .10 | .01 | 11.43 | 2.51 | 0.956 | 149.0 | 51.8 | 53.0 |
| .0667 | .00445 | 11.56 | 2.56 | 0.956 | 67.1 | 50.7 | 52.4 |
| .05 | .0025 | 11.70 | 2.63 | 0.956 | 38.2 | 38.2 | 51.8 |
| .04 | .0016 | 11.81 | 2.69 | 0.956 | 24.7 | 24.7 | 51.3 |
| .0333 | .00111 | 11.95 | 2.75 | 0.956 | 17.4 | 17.4 | 50.7 |

In Table VIII, the flow rate ratios $$\frac{W}{W'}$$

are arbitrarily chosen; $t_2'$ is determined by the solution of Equation 9; $t_1'$ is determined by the solution of Equation 7; and $\Delta P_C$ is the solution of Equation 6 at flow rate W'.

Figure 34:
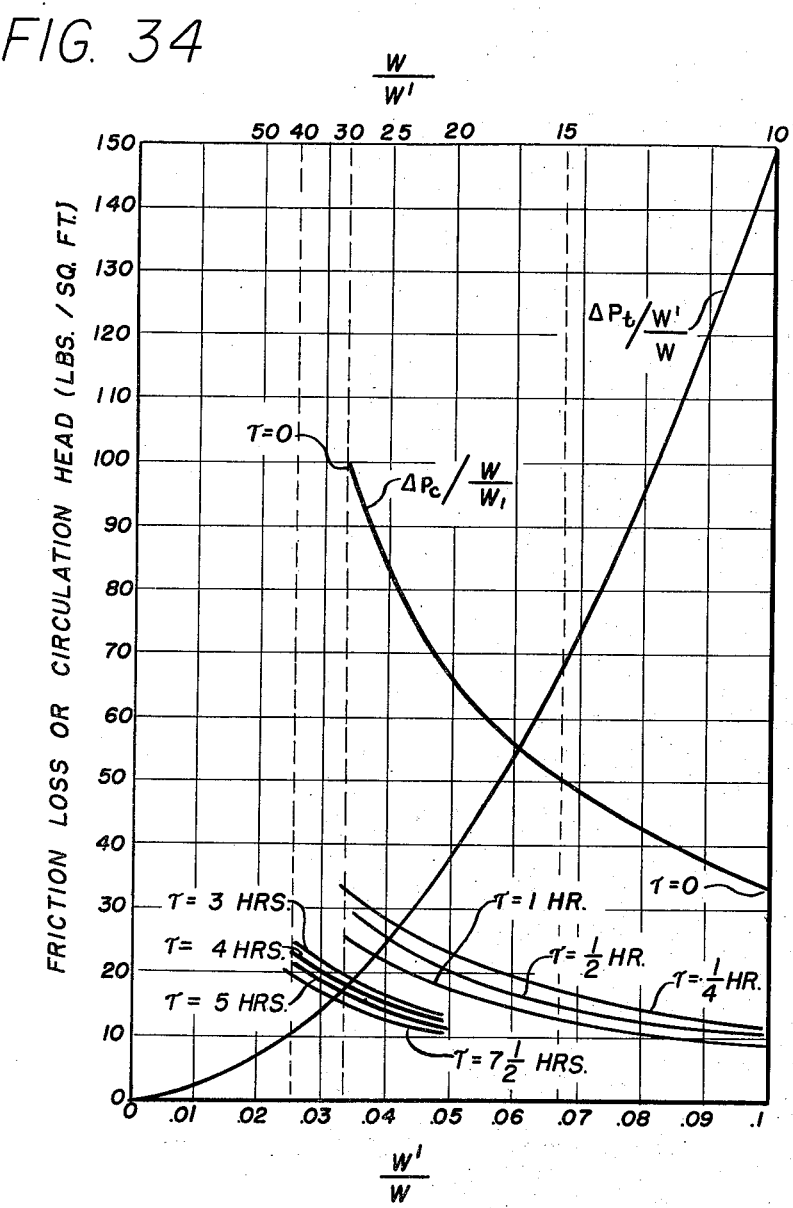
Figure 34 is a graphic representation of changes in circulation head and pumping power with time after shutdown of the reactor of the present invention.

In Table IX, the flow rate ratios correspond with those of Table VIII; (3), (4) and (5) are factors in Equation 2, and $\Delta P_t$ is the solution of Equation 2.

$$\Delta P_t \text{ vs. } \frac{W'}{W}$$

is then plotted on the graph of Figure 34.

$$\Delta P_c \text{ vs. } \frac{W}{W'}$$

for the time after shutdown $(\tau)$ equals to zero is plotted on the same graph. The temperature $(t_4)$ of the coolant entering the reactor core was given, and the temperature $(t_2)$ of the coolant leaving the reactor core is obtained by the solution of Equation 9, where the pumping power or flow rate $$\frac{W}{W'}$$

is determined from the intersection of the $\Delta P_t$ and $\Delta P_c$ curves of Figure 34. The intersection point is the point where the friction pressure loss equals the thermal head for a given heat production in the reactor. These temperatures for zero time after shutdown are $t_4 = 653°$ F. and $t_2 = 1100°$ F.

The power curve of Figure 31 is integrated to determine the total quantity of heat (Q) released in different periods after shutdown. The temperature $(t_4)$ of the coolant in the reactor tank for various times after shutdown may then be determined by the solution of Equation 10, as shown in the following table, Table X.

Table X

| Time after shutdown, hrs. | Total heat released (Q) B.t.u.$\times 10^{-6}$ | $t_4' - t_4$ | $t_4'$ |
|---|---|---|---|
| ½ | 35.43 | 106 | 759 |
| 1 | 60.29 | 181 | 834 |
| 2 | 102.48 | 307 | 960 |
| 3 | 138.64 | 416 | 1,069 |
| 4 | 171.79 | 515 | 1,168 |
| 5 | 201.93 | 606 | 1,259 |
| 10 | 337.56 | 1,013 | 1,666 |

Tables similar to Tables VII and IX, for other times after shutdown, may then be prepared, and the $\Delta P_c$'s curves plotted against the $\Delta_t$ curve of Figure 34. (It has been found that the $\Delta P_t$ curve is not substantially different for all temperatures within the range of interest.) With the flow rates for other times after shutdown, thus determined, the temperature of the coolant leaving the core ($t_2$) may be determined by the solution of Equation 9.

The $\Delta P_c$ curves for various other times have been plotted on Figure 34 and the temperatures of the coolant leaving the core have been determined and are tabulated in the following table, Table XI.

*Table XI*

| Time after shutdown, hrs. | Temp. of coolant at core inlet, $t_4'$, °F. | Temp. of coolant at core outlet, $t_2$, °F. |
|---|---|---|
| ¼ | 715 | 935 |
| ½ | 759 | 960 |
| 1 | 834 | 1,020 |
| 3 | 1,069 | 1,220 |
| 4 | 1,169 | 1,304 |
| 5 | 1,259 | 1,400 |
| 7½ | 1,475 | 1,605 |

Figure 32:
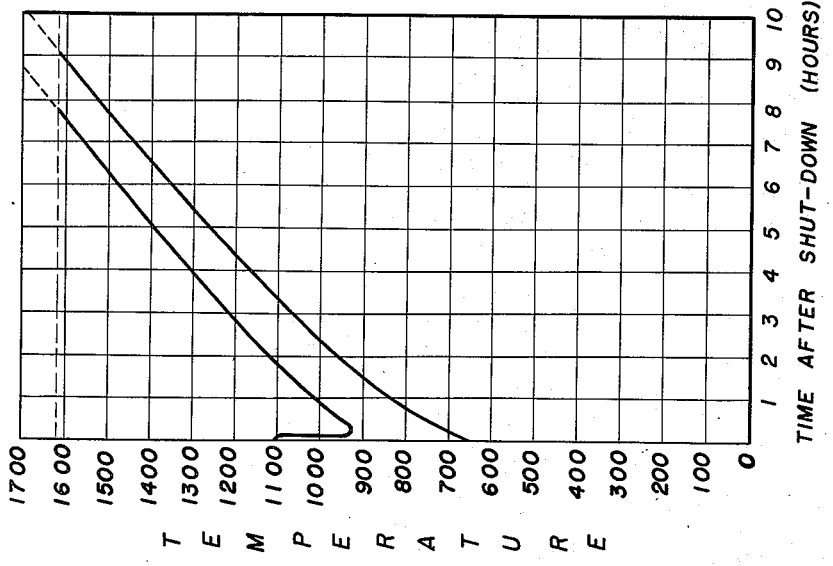
Figure 32 is a graphic representation of the time after shutdown of the reactor versus temperature of the primary coolant of the reactor of the present invention.

The curves of the reactor core inlet (bulk sodium in tank) temperatures and the reactor core outlet temperatures are shown graphically in Figure 32. It will be noted that the Emergency Shutdown Safety Factor of the 800 liter reactor with 1,110,000 lbs. of sodium as the primary coolant of the present invention is 7.7 (as shown by the $t_2$ line of the graph intersecting the boiling point of sodium line at that time). Thus the minimum time in which the reactor primary coolant could reach the boiling temperature after shutdown is approximately 7 hours and 42 minutes.

Figure 33:
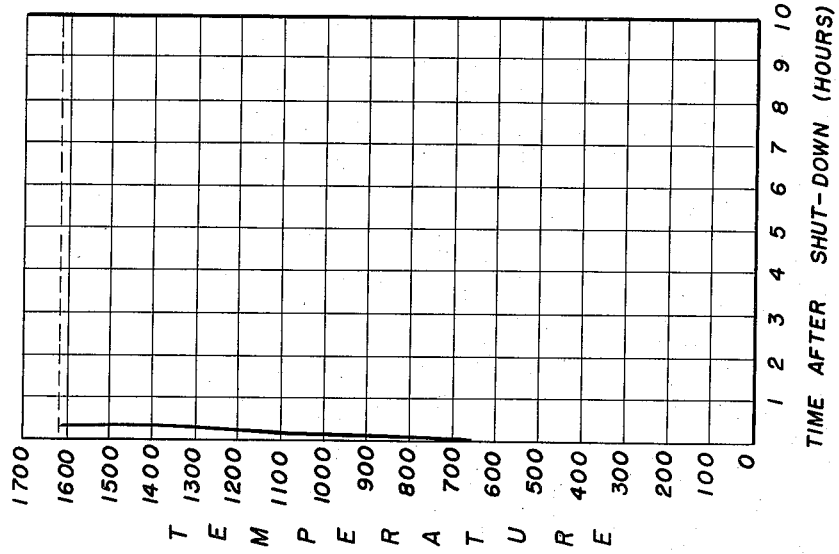
Figure 33 is a graphic representation of the time after shutdown versus temperature of the primary coolant of a conventional reactor having a closed primary coolant circut.

Now, similar calculations have been carried out upon exactly the same assumptions as the preceding calculations, except that the primary coolant flow path is closed by a pipe between the inlet and the outlet of the system, thus making the coolant system a closed cycle. The average bulk sodium temperature of this closed loop has been graphed in Figure 33 and, as shown by the figure, this reactor would have an ESSF of 0.33 which means that the temperature of the sodium could reach its boiling point in approximately 20 minutes after shutdown. The following assumptions were made in the calculations, so that the calculated times are minimum times. The assumptions for the open loop calculations are as follows:

(1) Good mixing is obtained in the sodium pool so that a uniform temperature is maintained.

(2) The heat capacity of the system is assumed to be that of the sodium in the pool external to the loop.

(3) There is no heat loss to the environment.

For the closed loop calculations:

(1) Good mixing of sodium in the loop is maintained.

(2) The heat capacity of the system is assumed to be that of the sodium in the loop only.

(3) There is no heat loss to the environment.

Since the assumptions for both the open and the closed loop, however, are substantially equivalent, the comparison of the relative safety factor after shutdown for the two systems is valid. The quantitative results show the tremendous safety factor advantage in the design of the present reactor.

While the reactor of the above example, with the stated power production, core dimensions, core materials, etc., has as ESSF of 7.4 with a primary coolant consisting of 1,110,000 lbs. of sodium, it could be possible that under certain conditions for the reactor a different ESSF would be desirable. For example, an ESSF of 4 hours might be adequate for the particular location of the reactor and, as has been previously pointed out, an ESSF of 4 hours is usually considered to be the minimum. The quantity of sodium required to give this ESSF was determined by the method described above to be 685,000 lbs. for the 800 liter reactor described above.

Now, it may be pointed out that by means of the foregoing conventional mathematical treatment the safety factors of any particular reactor may be determined. The problem of whether a convective flow of the primary coolant in the primary coolant system will be established after shutdown of the reactor can be determined first. Then, if it is established that the reactor is capable of establishing free convective flow of the primary coolant after shutdown, the problem of the length of time required to reach the boiling point of the primary coolant can be solved. It will be readily apparent that this mathematical approach can be applied to a reactor having any particular primary coolant circuit configuration, operated at any particular power level, and having any particular liquid coolant.

It may further be pointed out that, in addition to offering the above protection against the extreme hazard of coolant vaporization after shutdown, the present reactor design also protects the reactor from damage to the reactor and associated equipment by too rapid cooling after shutdown. Other emergency reactor coolant systems have been devised which depend upon auxiliary tanks of primary coolant to be introduced into the reactor coolant system in case of shutdown. Since these auxiliary tanks are located outside the reactor shield, they must require a separate heating system with attendant loss in power to maintain the auxiliary coolant above its freezing point. This is avoided by the present design. Furthermore, the heat from the reactor itself, in addition to maintaining the sodium above the freezing point, maintains it at a temperature high enough that there will be no thermal shock to the reactor components when the sodium flows through the reactor after shutdown, as there would be if a much cooler fluid were introduced into the reactor after shutdown.

Another advantage of the present design is the effect upon the secondary coolant and steam generating system after shutdown. The open tank system and large quantity of sodium in the pool form a system that will continue to convey heat at a reduced rate to the secondary coolant by convective flow in the primary circuit for a long time after shutdown. The heat energy generated after shutdown can be made available to the steam system through the secondary coolant system and will tend to prevent thermal shock to the components of the steam system if the steam system is operated at a reduced flow rate after shutdown.

The safety features of the present design may therefore be summarized as follows. The immersion of the reactor and primary heat exchanger in a pool of the primary coolant contained in a double-walled container with no outlets below the coolant surface practically precludes the total loss of primary coolant. The active convective cooling system made possible by the use of vertical coolant channels in the reactor, a minimum of friction losses in the coolant system, pumps which have very little retarding effect on the flow of the coolant, the open circuit and the tremendous mass of primary coolant available for convective coolant, greatly prolong the time interval between the emergency shutdown of the reactor and the time at which it would be necessary to introduce auxiliary cooling methods to prevent coolant vaporization. The tremendous heat inertia of the coolant system and its availability through convective cooling both to the reactor and to the secondary heat exchanger and associated steam producing apparatus prevent thermal shock to the reactor and heat exchanger components at shutdown. The design, whereby the primary coolant is maintained within a single cell, makes the shielding of the reactor and the intensely radioactive primary coolant relatively simple and comparatively safe.

As a further aid in understanding the present invention, reference is made to the following publications: Experimental Production of Divergent Chain Reaction, E. Fermi, American Journal of Physics, vol. 20, No. 9, December 1952; Science and Engineering of Nuclear Power, C. Goodman, Addison Wesley Press, Inc., Cambridge, Mass., vol. 1 (1947), and vol. 2 (1949); The Elements of Nuclear Reactor Theory, S. Glasstone and M. Edlund, D. Van Nostrand Co., Inc., New York, 1952; Elementary Pile Theory, H. Soodak and E. C. Campbell, John Wiley and Sons, New York, 1950; and to the copending U. S. patent application, Serial No. 568,904, of common assignee, filed December 19, 1944, in the names of E. Fermi and L. Szilard, now Patent No. 2,708,656.

While the foregoing description of the invention describes a particular reactor in detail, it is not intended that the scope of the invention be limited except insofar as set forth in the following claims.

What is claimed is:

1. A nuclear reactor system comprising an imperforate reactor tank containing a liquid metal as primary coolant, a fast nuclear reactor having coolant passages with a predominantly vertical component submerged in said liquid metal, a heat exchange system submerged in said liquid metal, said heat exchange system comprising a primary heat exchanger and a primary coolant pump, a pipe connecting one end of said coolant passages to the inlet end of the heat exchanger, a pipe connecting the other end of the coolant passages to the outlet end of the pump, said heat exchanger having an outlet within the tank and said pump having an inlet within the tank, and means for passing a secondary coolant through said heat exchangers.

2. A nuclear reactor system according to claim 1 in which the primary coolant is a liquid metal selected from the group consisting of sodium and NaK.

3. A nuclear reactor system comprising an imperforate reactor tank containing a liquid metal as primary coolant, a fast nuclear reactor having vertical coolant passages therethrough and being submerged in said liquid metal, said reactor having a fuel region free of moderating material containing between about 3 and 10 volume percent of a material fissionable by thermal neutrons, between about 20 and 32 volume percent of a diluent, the balance being primary coolant and structural material, and having a blanket region surrounding said fuel region containing a substantial proportion of fertile material, a heat exchange system submerged in said liquid metal, said heat exchange system comprising a primary heat exchanger and a primary coolant pump, a pipe connecting one end of said coolant passages to the inlet end of the heat exchanger, a pipe connecting the other end of the coolant passages to the outlet end of the pump, said heat exchanger having an outlet within the tank and said pump having an inlet within the tank, and means for passing a secondary coolant through said heat exchanger.

4. The reactor system of claim 3 in which the thermal neutron fissionable material is plutonium, the diluent is uranium, and the fertile material is uranium containing less than 0.7% of the $U^{235}$ isotope.

5. The reactor system of claim 3 in which the thermal neutron fissionable material is $U^{235}$, the diluent is thorium, and the fertile material is thorium.

6. A nuclear reactor system according to claim 3 in which the primary coolant is a liquid metal selected from the group consisting of Na and NaK and in which the fissionable material is plutonium.

7. A system according to claim 6 in which the coolant is liquid Na.

8. A system according to claim 6 in which the coolant is liquid NaK.

9. A fast nuclear reactor comprising a cylindrical active portion containing 450 kilograms of plutonium in a uranium-plutonium alloy, said alloy being in the form of 0.164-inch diameter fuel cylinders, contained in stainless steel tubes with a sodium bonding agent between said cylinder and said tube, the reactor active portion containing 127 fuel rod assemblies, each cylinder containing approximately 21 grams of plutonium each assembly containing 169 fuel cylinders, coolant channels through said fuel rod assemblies and occupying 45 volume percent of said active portion, the reactor active portion being surrounded by a blanket region containing 109,000 kilograms of a depleted uranium having less than 0.7% of the $U^{235}$ isotope, said blanket region being comprised of a cylindrical upper axial region having a diameter equal to the diameter of the active portion and being adjacent to the upper surface of the active portion, a cylindrical lower axial blanket region of substantially similar configuration as the upper axial blanket region and disposed adjacent to the lower surface of the active portion, and a hollow cylindrical radial blanket region surrounding the upper and lower axial blanket regions and active portion, the upper and lower blanket regions being comprised of 40 volume percent depleted uranium, 10 volume percent stainless steel structural material, 45 volume percent dynamic sodium coolant, and 5 volume percent stagnant sodium coolant, the radial blanket region being comprised of 70 volume percent depleted uranium, 10 volume percent stainless steel structural material and 20 volume percent dynamic sodium coolant, and a reflector region comprising 51,300 pounds of graphite surrounding said radial blanket region.

10. A nuclear reactor system comprising an imperforate reactor tank containing the nuclear reactor of claim 9, said reactor having parallel vertical coolant passages through the active portion and blanket regions, the passages connecting with an upper outlet plenum chamber, and a lower inlet manifold, the plenum chamber having at least one outlet leg comprising a primary heat exchanger and outlet unit having an outlet within said tank, and connecting piping, the inlet manifold having at least one inlet leg, comprising a low resistance primary coolant pump, and inlet unit having an inlet within said tank, and connecting piping, the primary coolant circuit and tank containing 1,110,000 pounds of sodium, a secondary coolant circuit connecting said primary heat exchangers with a steam generating system, and containing a sodium-potassium alloy.

11. A nuclear reactor system comprising an imperforate, unitary reactor tank, containing a fast nuclear reactor having vertical coolant channels, and capable of producing at least 500 megawatts of heat energy, the coolant channels being connected with a plurality of reactor exit pipes which are in turn connected to a primary heat exchanger having an outlet, said primary heat exchanger and its outlet being located within the tank, and a plurality of inlet coolant legs, each comprising a low resistance primary coolant pump within the tank and an inlet unit having an inlet within said tank, and said reactor system containing a sufficient amount of sodium primary coolant to insure an Emergency Shutdown Safety Factor of the reactor system of at least four.

References Cited in the file of this patent

UNITED STATES PATENTS

| | | |
|---|---|---|
| 2,708,656 | Fermi et al. | May 17, 1955 |
| 2,736,696 | Wigner et al. | Feb. 28, 1956 |
| 2,743,224 | Ohlinger et al. | Apr. 24, 1956 |
| 2,743,225 | Ohlinger et al. | Apr. 24, 1956 |

FOREIGN PATENTS

| | | |
|---|---|---|
| 648,293 | Great Britain | Jan. 3, 1951 |

OTHER REFERENCES

Pocket Encyclopedia of Atomic Energy, edited by Frank Gaynor, Philosophical Library, N. Y., 1950, page 62.

(Other references on following page)

OTHER REFERENCES

AECD-3712, History and Status of the EBR by W. E. Unbehaun, Atomic Energy Comm., Apr. 15, 1953, available from AEC Technical Information Service, Oak Ridge, Tenn.

Nucleonics, June 1953, pages 56-64.

Nucleonics, February 1954, pages 13-15.

Bulletin of Atomic Scientists, June 1953, pages 169-174.

Popular Mechanics, May 1954, pages 89-94, 262, 264, 268.

Nuclear Engineering, Part II, American Institute of Chemical Engineers, N. Y. C. Chemical Engineering Progress Symposium, Series No. 12 (1954), vol. 50, page 244.

UNITED STATES PATENT OFFICE
Certificate of Correction

Patent No. 2,841,545                                              July 1, 1958

Walter H. Zinn

It is hereby certified that error appears in the printed specification of the above numbered patent requiring correction and that the said Letters Patent should read as corrected below.

Column 11, line 27, for "0" read *60*; column 24, Table VIII, section (2), for "$t_2$" read $t_2'$; section (3), for "$t_1$" read $t_1'$; section (4), for ".113$t_1$'" read *.113$t_2'$*; section (5), for ".0213$t_2$'" read *.0213$t_1'$*; section (6) for "33." read *33.6*; column 24, Table IX, next to last section, for "$\rho_2$" read $\rho_2'$; same table, last section, for "$\rho_1$" read $\rho_1'$; column 25, line 3, for "$\Delta_t$" read $\Delta P_t$.

Signed and sealed this 30th day of December 1958.

[SEAL]

Attest:
KARL H. AXLINE,
*Attesting Officer.*

ROBERT C. WATSON,
                                                                                *Commissioner of Patents.*